United States Patent [19]

Miyabayashi et al.

[11] Patent Number: 4,625,005

[45] Date of Patent: Nov. 25, 1986

[54] MULTI-COMPONENT COPOLYMER RUBBER, A PROCESS FOR PRODUCING THE SAME, AND A RUBBER COMPOSITION CONTAINING THE MULTI-COMPONENT COPOLYMER RUBBER

[75] Inventors: Toshio Miyabayashi; Nobuyuki Sakabe; Yoshiyuki Udagawa, all of Yokkaichi; Hiroji Enyo, Suzuka; Yasuhiko Takemura, Yokkaichi, all of Japan

[73] Assignee: Japan Synthetic Rubber Co., Ltd., Tokyo, Japan

[21] Appl. No.: 716,350

[22] Filed: Mar. 26, 1985

[30] Foreign Application Priority Data

| Mar. 28, 1984 | [JP] | Japan | 59-60351 |
| Mar. 28, 1984 | [JP] | Japan | 59-60352 |
| Mar. 28, 1984 | [JP] | Japan | 59-60353 |
| Mar. 29, 1984 | [JP] | Japan | 59-61757 |
| Mar. 29, 1984 | [JP] | Japan | 59-61758 |
| Mar. 31, 1984 | [JP] | Japan | 59-64132 |
| Mar. 31, 1984 | [JP] | Japan | 59-64133 |
| Apr. 6, 1984 | [JP] | Japan | 59-68678 |
| Apr. 14, 1984 | [JP] | Japan | 59-75583 |
| Aug. 10, 1984 | [JP] | Japan | 59-167544 |
| Nov. 19, 1984 | [JP] | Japan | 59-244127 |

[51] Int. Cl.$^4$ ............................................. C08F 20/34
[52] U.S. Cl. .................................. 526/273; 526/292.6; 526/292.9; 526/293; 525/217; 525/208
[58] Field of Search ............ 526/298, 273, 283, 292.9, 526/292.6, 293; 525/217

[56] References Cited

U.S. PATENT DOCUMENTS

| 3,397,193 | 8/1968 | Aloia | 526/292.6 |
| 3,445,403 | 5/1969 | Tucker | 526/298 |
| 4,237,258 | 12/1980 | Cantalupo | 526/273 |
| 4,333,963 | 6/1982 | Emmons | 526/298 |
| 4,360,540 | 11/1982 | Chong | 526/298 |
| 4,490,515 | 12/1984 | Mariotti | 526/298 |

*Primary Examiner*—Paul R. Michl
*Attorney, Agent, or Firm*—Oblon, Fisher, Spivak, McClelland & Maier

[57] ABSTRACT

A multi-component copolymer rubber consisting essentially of (A) 20 to 69.5% by weight of a cyano-substituted alkyl (meth)acrylate, (B) 30 to 79.5% by weight of an alkyl acrylate, (C) 0.5 to 10% by weight of a crosslinkable monomer and (D) 0 to 10% by weight of other ethylenically unsaturated monomer copolymerizable with (A), (B) and (C), excels in heat resistance, ozone resistance, sour gasoline resistance and sour gasohol resistance. These properties of said multi-component copolymer rubber can further be improved by incorporating into the copolymer rubber a crosslinking agent, a metal salt, a vinylidene fluoride polymer, a vinyl chloride resin or other multi-component copolymer rubber.

5 Claims, 3 Drawing Figures

F I G. 1
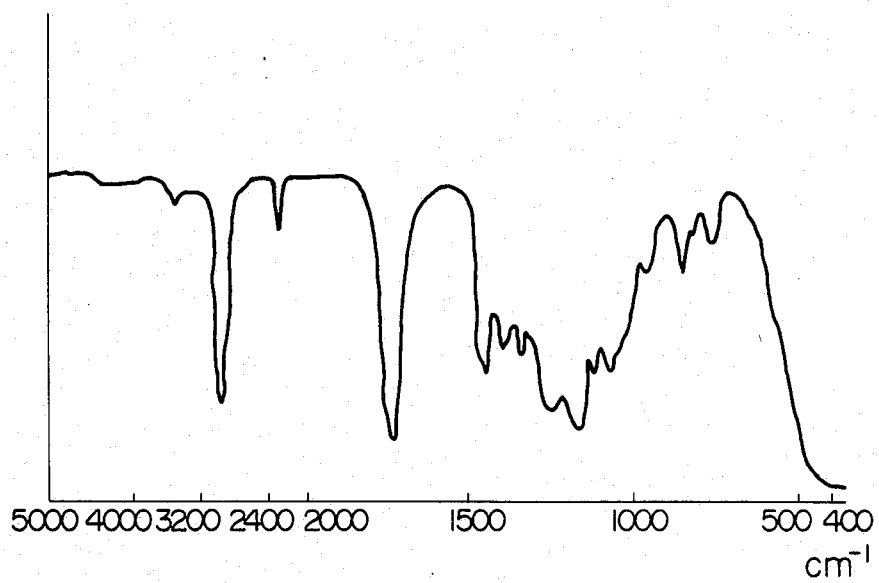
F I G. 2
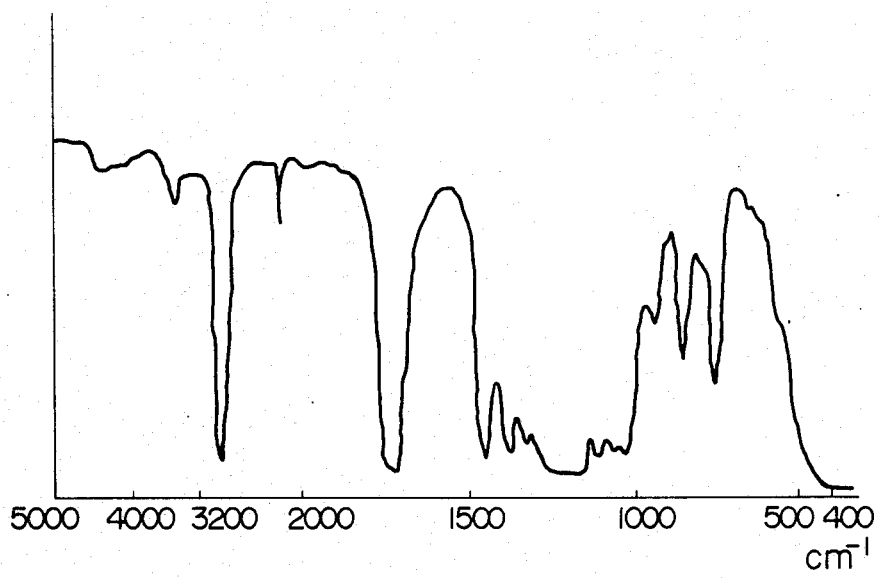

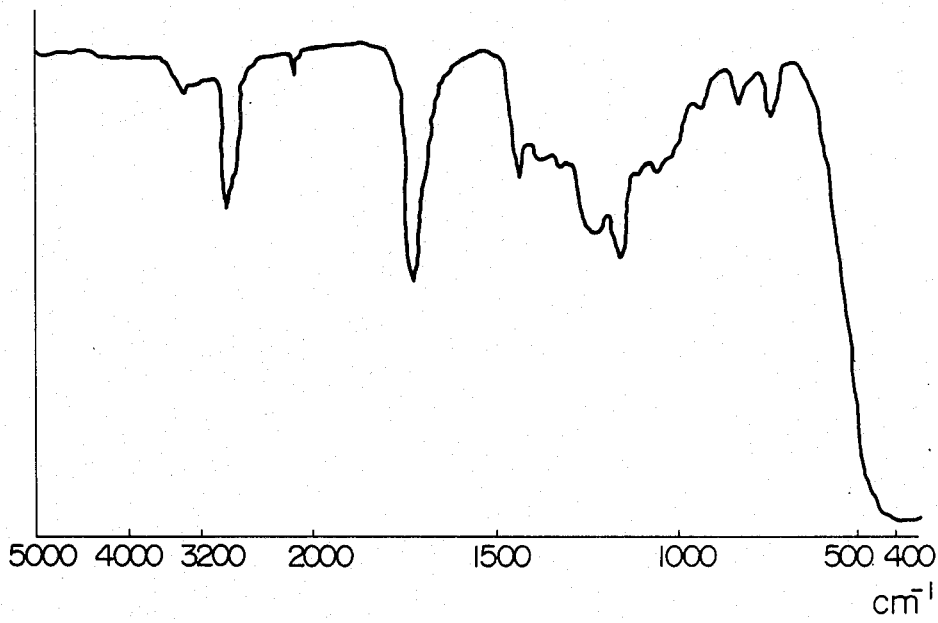
F I G. 3

MULTI-COMPONENT COPOLYMER RUBBER, A PROCESS FOR PRODUCING THE SAME, AND A RUBBER COMPOSITION CONTAINING THE MULTI-COMPONENT COPOLYMER RUBBER

This invention relates to a novel multicomponent copolymer rubber consisting essentially of a cyano-substituted alkyl (meth)acrylate, an alkyl acrylate and a diene monomer, excellent in heat resistance, ozone resistance, sour gasoline resistance and sour gasohol resistance, as well as to a rubber composition containing said multi-component copolymer rubber end and other components.

In recent years, in automobiles, gasoline-resistant rubbers are in use in atmospheres whose temperatures are becoming increasingly higher in connection with countermeasures for exhaust gas regulations and engine modifications for higher performance. Hence, there is now required a gasoline-resistant rubber excellent in heat resistance and ozone resistance. With respect to these gasoline-resistant rubbers, there is a further problem that gasolines are oxidized in fuel systems of automobiles, etc. to produce a sour gasoline [the sour gasoline refers to a gasoline containing peroxides produced by gasoline oxidation at high temperatures and it is described in detail in A. Nersasian, Rubber and Plastics News, June 26 (1978)] and this sour gasoline deteriorates gasoline-resistant rubbers.

In connection with tight supply of crudes on worldwide basis, addition of an alcohol to a gasoline has been tried. This gasoline-alcohol mixture, namely, gasohol is also oxidized to produce a sour gasohol and this sour gasohol deteriorates gasoline-resistant rubbers as well.

As gasoline-resistant rubbers, butadieneacrylonitrile rubber has widely been used in such applications as hoses, gaskets, O-rings, packings and oil seals. However, butadiene-acrylonitrile rubber is poor in ozone resistance and insufficient in heat resistance and sour gasoline resistance, and therefore, it is difficult to provide a rubber part having a sufficient reliability even when used in contact with a gasoline at high temperatures as mentioned above.

In order to overcome the drawbacks of butadiene-acrylonitrile rubber, it is known to use a blend of butadiene-acrylonitrile rubber with poly(vinyl chloride), thereby improving sour gasoline resistance and ozone resistance [Japanese Patent Application Kokai (Laid-Open) No. 89,388/80]. However, this blend has no improved heat resistance, is poor in other properties such as low-temperature resistance and permanent compression set, which are required as gasoline-resistant rubber materials and cannot be said to have sufficient gasohol resistance. Hence, it has been desired to overcome these drawbacks. Fluororubber has been spotlighted as a gasoline-resistant rubber material because of its excellency in sour gasoline resistance, ozone resistance and heat resistance. However, the fluororubber has an insufficient flexibility at low temperatures, and poor physical properties, and is difficult to handle and very expensive. Accordingly it cannot be used as a general purpose gasoline resistant rubber.

Under such circumstances, the present inventors have studied on various materials which are excellent in heat resistance, ozone resistance, sour gasoline resistance and sour gasohol resistance and which can easily be used as a gasoline-resistant and gasohol-resistant material using conventional molding equipments and techniques. As a result, it has been found that the above requirements can be met by a novel multi-component copolymer consisting essentially of a cyano-substituted alkyl (meth)acrylate, an alkyl acrylate and a crosslinkable monomer and also by a composition of said multi-component copolymer and other components.

According to this invention, there is provided a multi-component copolymer rubber consisting essentially of (A) 20 to 69.5% by weight of a cyano-substituted alkyl (meth)acrylate,
(B) 30 to 79.5% by weight of an alkyl acrylate,
(C) 0.5 to 10% by weight of a crosslinkable monomer, and
(D) 0 to 10% by weight of other ethylenically unsaturated monomer copolymerizable with the components (A), (B) and (C).

This invention further provides a process for producing said copolymer rubber, a composition of said copolymer rubber and other components, and uses of said copolymer rubber and said composition.

The cyano-substituted alkyl (meth)acrylate which is the component (A) of the multi-component copolymer rubber of this invention is represented by the formula (I):

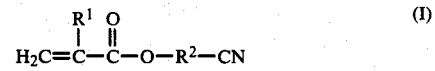

wherein $R^1$ is a hydrogen atom or a methyl group and $R^2$ is an alkylene group. In the formula (I), $-R^2-CN$ is a cyanoalkyl group of 2 to 12 carbon atoms. Specific examples of the cyano-substituted alkyl (meth)acrylate are cyanomethyl (meth)acrylate, 1-cyanoethyl (meth)acrylate, 2-cyanoethyl (meth)acrylate, 1-cyanopropyl (meth)acrylate, 2-cyanopropyl (meth)acrylate, 3-cyanopropyl (meth)acrylate, 4-cyanobutyl (meth)acrylate, 6-cyanohexyl (meth)acrylate, 2-ethyl-6-cyanohexyl (meth)acrylate, 8-cyanooctyl (meth)acrylate, etc. Of these, preferred are 2-cyanoethyl acrylate, 3-cyanopropyl acrylate and 4-cyanobutyl acrylate. Particularly, 2-cyanoethyl acrylate is preferred.

The alkyl acrylate which is the component (B) is represented by the formula (II):

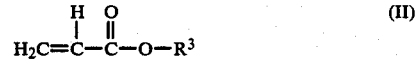

wherein $R^3$ is an alkyl group having 1 to 18 carbon atoms. Specific examples of the alkyl acrylate are methyl acrylate, ethyl acrylate, n-propyl acrylate, n-butyl acrylate, isobutyl acrylate, n-pentyl acrylate, iso-amyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, etc. Of these, preferred are ethyl acrylate, propyl acrylate, n-butyl acrylate, n-pentyl acrylate, n-hexyl acrylate, 2-ethylhexyl acrylate and n-octyl acrylate. Particularly, ethyl acrylate and n-butyl acrylate are preferred.

As the crosslinkable monomer which is the component (C), there can be used (C-I) a diene compound, (C-II) a (meth)acrylic acid ester containing a dihydrodicyclopentadienyl group, (C-III) an epoxy group-containing, ethylenically unsaturated compound, (C-IV) an active halogen-containing, ethylenically unsaturated compound, (C-V) an active hydrogen-containing monomer and (C-VI) a carboxyl group-containing monomer.

The diene compound (C-I) includes non-conjugated dienes such as alkylideneorbornenes, alkenylnorbornenes, dicyclopentadiene, methylcyclopentadiene and dimers thereof as well as conjugated dienes such as butadiene and isoprene. Of these, nonconjugated dienes are preferred, and alkylidenenorbornenes are particularly preferred. Of the alkylidenenorbornenes, ethylidenenorbornene is most preferable.

(meth)acrylic acid ester containing a dihydrodicyclopentadienyl group (C-II) includes dihydrodicyclopentadienyl (meth)acrylate, dihydrodicyclopentadienyl oxyethyl(meth)acrylate and the like.

The epoxy group-containing, ethylenically unsaturated monomer (C-III) includes allyl glycidyl ether, vinyl glycidyl ether, 2-methyl-1-propenyl glycidyl ether, glycidyl methacrylate and glycidyl acrylate. Of these, allyl glycidyl ether, glycidyl methacrylate and glycidyl acrylate are preferred. Allyl glycidyl ether is most preferable.

The active halogen-containing, ethylenically unsaturated compound (C-IV) includes vinylbenzyl chloride, vinylbenzyl bromide, 2-chloroethyl vinyl ether, vinyl chloroacetate, ethylene chloroacetate methacrylate, vinyl chloropropionate, allyl chloroacetate, allyl chloropropionate, 2-chloroethyl acrylate, 2-chloroethyl methacrylate, 2-hydroxypropylene chloroacetate methacrylate, chloromethyl vinyl ketone, 2-chloroacetoxymethyl-5-norbornene, norbornylmethyl chloroacetate, 4-chloromethylstyrene, vinyl chloride, vinylidene chloride, etc. Of these, preferred are vinyl chloroacetate, allyl chloroacetate, 2-chloroethyl vinyl ether, vinylbenzyl chloride, 2-chloroethyl methacrylate and 2-chloroethyl acrylate.

The active hydrogen-containing monomer (C-V) includes allyl cyanoacetate, etc.

The carboxyl group-containing monomer includes acrylic acid, methacrylic acid, crotonic acid, 2-pentenoic acid, maleic acid, fumaric acid, itaconic acid, etc.

The other ethylenically unsaturated monomer which is the component (D) is an optional component. It includes methacrylates such as methyl methacrylate, octyl methacrylate and the like; alkoxyalkyl acrylates such as methoxyethyl acrylate, butoxyethyl acrylate and the like; alkyl vinyl ketones such as methyl vinyl ketone and the like; vinyl ethers and allyl ethers such as vinyl ethyl ether, allyl methyl ether and the like; vinyl aromatic compounds such as styrene, α-methylstyrene, chlorostyrene, vinyltoluene and the like; alkenylnitriles such as acrylonitrile, methacrylonitrile and the like; alkenylamides such as acrylamide, methacrylamide, N-methylolacrylamide and the like; and alkyl fumarates.

The proportions of the components (A), (B), (C) and (D) in the copolymer rubber of this invention are 20 to 69.5%, preferably 25 to 60%, by weight of the component (A), 30 to 79.5%, preferably 35 to 75%, by weight of the component (B), 0.5 to 10%, preferably 0.5 to 5%, by weight of the component (C) and 0 to 10%, preferably 0 to 7%, by weight of the component (D).

When the component (A) is less than 20% by weight, the copolymer rubber is poor in gasoline resistance and sour gasoline resistance. When the component (A) exceeds 69.5% by weight, the copolymer rubber is poor in physical properties such as tensile strength and elongation.

When the component (B) is less than 30% by weight, the multi-component copolymer rubber is poor in physical properties. When the component (B) exceeds 79.5% by weight, the multi-component copolymer rubber is deteriorated in gasoline resistance and sour gasoline resistance.

When the component (C) is less than 0.5% by weight, the multi-component copolymer rubber requires a long time for crosslinking and has no sufficient tensile strength as possessed by crosslinked rubbers. When the component (C) exceeds 10% by weight, the multi-component copolymer rubber becomes hard and has a reduced elongation.

The glass transition temperature of the multi-component copolymer rubber of this invention is preferably a glass transition temperature of −10° C. or less.

The multi-component copolymer rubber of this invention can easily be produced by subjecting to radical polymerization a mixture consisting of (A) 15 to 70% by weight of a cyano-substituted alkyl (meth)acrylate, (B) 30 to 84.5% by weight of an alkyl acrylate, (C) 0.5 to 15% by weight of a crosslinkable monomer and (D) 0 to 15% by weight of an ethylenically unsaturated monomer copolymerizable with (A), (B) and (C). This radical polymerization can be conducted by a conventional polymerization method such as bulk polymerization, solution polymerization, emulsion polymerization or suspension polymerization, wherein the monomers and other components are added at one time, continuously or intermittently.

The radical polymerization initiator used in the above polymerization may be conventional free radical catalysts such as peroxides, redox catalysts, persulfates and azo compounds. The polymerization can be conducted at a temperature ranging from 0° C. to 80° C., preferably 5° C. to 60° C.

The multi-component copolymer rubber obtained by the above polymerization can be recovered by a conventional coagulation method using a metal salt such as calcium chloride or the like or using a non-solvent such as ethanol, methanol or the like.

The form of the multi-component copolymer rubber of this invention is not critical, and the multi-component copolymer rubber can be produced in a solid form or in a liquid form depending upon the uses. The molecular weight of the multi-component copolymer rubber is not critical; however, when used in a solid form, the multi-component copolymer rubber has preferably a Mooney viscosity ($ML_{1+4}$, 100° C.) of 20 to 150, more preferably 25 to 100.

Into the multi-component copolymer rubber of this invention can optionally be incorporated conventional compounding agents such as a crosslinking agent, a crosslinking accelerator, a reinforcing agent, a filler, a plasticizer, a softener, an aging inhibitor, a stabilizer, a foaming agent and the like. The resulting compound can be subjected to crosslinking by a conventional method to easily obtain a crosslinked product.

As the above crosslinking agent, an appropriate compound may be selected depending upon the type of the functional group to be used in the formation of crosslinkage of the copolymer. For example, when a diene compound or a (meth)acrylic acid ester containing a dihydrodicyclopentadienyl group is introduced into the copolymer by copolymerization to form carbon-carbon double bonds in the copolymer, there can preferably be used conventional crosslinking agents which are employed for diene type rubbers (styrene-butadiene rubber, isoprene rubber, butadiene-acrylonitrile rubber, etc.), such as vulcanizing agents (e.g. sulfur, thiuram compound) and organic peroxides. When an epoxy group-containing monomer is introduced, the crosslinking agents may be ammonium compounds, polyamines, polyamine salts, a combination of a polyamine with sulfur or dibenzothiazyl disulfide, dithiocarbamic acid salts, a combination of sulfur with a metal salt of a fatty acid, a combination of sulfur with a metal salt of a fatty acid and a maleimide, thiourea derivatives, and a combination of a thiourea derivative with red lead or dibasic lead phosphite. When an active halogen-containing, ethylenically unsaturated compound is used, the crosslinking agents may be polyamines, polyamine salts, a combination of a polyamine with sulfur or dibenzothiazyl disulfide, ammonium compounds, a combination of a metal salt of a fatty acid with sulfur, a combination of a metal salt of a fatty acid with sulfur and a maleimide, thiourea derivatives, and a combination of a thiourea derivative and red lead or dibasic lead phosphite. When an active hydrogen-containing monomer is used, the crosslinking agents may be tetramethylthiuram disulfide or tetraethylthiuram disulfide. When a carboxyl group-containing monomer is used, the crosslinking agents may be zinc oxide or lead oxide. When the ammonium compounds are used as the crosslinking agent, they may be, for example, ammonium benzoate or ammonium adipate. When the polyamines are used, they may be, for example, triethylenetetramine, hexamethylenetetramine or triethyltrimethylenetriamine. An example of the polyamine salts is hexamethylenediamine carbamate. Examples of the dithiocarbamic acid salts are zinc dimethyldithiocarbamate and iron dimethyldithiocarbamate. Examples of the metal salts of fatty acids are sodium myristate, sodium palmitate, sodium stearate, sodium arachate, sodium behenate and their corresponding potassium salts. Examples of the thiourea derivatives are 2-mercaptoimidazoline and N,N'-diethylthiourea. An example of the maleimides is N,N'-m-phenylenebismaleimide.

The amount of the crosslinking agent used in this invention is not critical and may be varied appropriately depending upon the type and amount of cross-linkable monomer used and also depending upon the type of crosslinking agent used. For example, an ammonium compound is used in an amount of 0.1 to 5 parts by weight; a polyamine or a polyamine salt used in an amount of 0.1 to 5 parts by weight; sulfur used in an amount of 0.1 to 2 parts by weight; a dithiocarbamic acid salt used in an amount of 0.1 to 10 parts by weight; a metal salt of a fatty acid used in an amount of 0.1 to 10 parts by weight; and a thiourea derivative used in an amount of 0.1 to 5 parts by weight.

The crosslinked product of a vulcanizable rubber composition containing the multi-component copolymer rubber of this invention and a crosslinking agent excels in gasoline resistance, sour gasoline resistance, heat resistance and ozone resistance and has good low-temperature, resistance, tensile strength and elongation, and has a small permanent compression set. Therefore, it can be used in fuel system hoses of automobiles; other hoses, diaphragms and sealing materials (e.g. gasket, O-ring, oil seal) which come in contact with fuels, hydraulic oils, lubricating oils, etc.; rolls, transfer belts and conveyor belts requiring oil resistance and solvent resistance which are used in iron manufacure, spinning, printing, paper making, dyeing, etc.; and so forth. Being excellent particularly in sour gasoline resistance, the vulcanizable rubber composition can preferably be used as a rubber for fuel system hoses of automobiles.

A rubber compound obtained by optionally incorporating into the multi-component copolymer rubber of this invention, conventional compounding chemicals such as a reinforcing agent, a filler, a plasticizer, a softener, a crosslinking agent, a stabilizer and the like and further optionally incorporating polymers such as PVC, acrylic rubber, NBR, fluororubber, epichlorohydrin rubber and the like, is excellent in gasoline resistance, sour gasoline resistance, ozone resistance and heat resistance and further good in tensile strength, elongation and low-temperature resistance. Therefore, the rubber compound provides a very excellent material for use in inner tubes of fuel system rubber hoses of automobiles, particularly for use in inner tubes of rubber hoses connecting metal pipes in automobile engines.

In this invention, a mixture consisting of (A) a cyano-substituted alkyl (meth)acrylate, (B) an alkyl acrylate, (C) a crosslinkable monomer and (D) other ethylenically unsaturated monomer is emulsion-polymerized at 0° C. to 80° C. in the presence of a radical polymerization catalyst, and to the resulting polymerization mixture is added a metal salt or a combination of an inorganic acid and a metal salt to coagulate a copolymer rubber, after which a releasing agent is added to the copolymer rubber coagulated, to obtain a multi-component copolymer rubber composition which has good kneadability, excellent heat resistance, ozone resistance and sour gasoline resistance and good tensile strength and elongation.

The metal salt may be calcium chloride, magnesium sulfate or the like. The inorganic acid may be sulfuric acid, or the like.

The releasing agent may be hydrocarbon compound such as paraffin wax or the like; a fatty acid compound such as stearic acid or the like; a fatty acid amide compound; a fatty acid ester compound; a phosphoric acid ester compound; or a metal salt of a fatty acid. Of these, preferred as metal salts of fatty acids, phosphoric acid ester compounds and fatty acid ester compounds. Metal salts of fatty acids are more preferable in view of the good kneadability of the rubber composition obtained, and the addition of the metal salt does not result in any deterioration of the physical properties of the vulcanizate.

The amount of the releasing agent used is preferably 0.5 to 10 parts by weight per 100 parts by weight of the rubber. When the amount is less than 0.5 part by weight, the kneadability of the rubber composition obtained is not improved. When the amount exceeds 10 parts by weight, the physical properties of a vulcanizate of the rubber composition obtained are greatly deteriorated.

The releasing agent can be added mechanically by a conventional molding equipment such as a roll, a Banbury mixer, a kneader or the like. Alternatively, it can be added in the form of an emulsion.

Addition of a plasticizer is preferred for improvement of the low-temperature resistance. The plasticizer may be a phthalic acid derivative compound such as diethyl phthalate, di-(2-ethylhexyl)phthalate, dibutyl phthalate, di-n-octyl phthalate, dimethylcyclohexyl phthalate or the like; an isophthalic acid derivative compound such as diisooctyl isophthalate or the like; a tetrahydrophthalic acid derivative compound such as di-(2-ethylhexyl)tetrahydrophthalate or the like; an adipic acid derivative compound such as di-(2-ethylhexyl)adipate, di-(butoxyethoxyethyl)adipate, butyldiglycol adipate or the like; an azelaic acid derivative compound such as di-(2-ethylhexyl)azelate or the like; a sebacic acid derivative compound such as di-(2-ethylhexyl)sebacate, di-n-butyl sebacate or the like; a fatty acid derivative compound such as diethylene glycol monolaurate or the like; a phosphoric acid derivative compound such as tri(2-ethylhexyl)phosphate, triphenyl phosphate or the like; a glycol derivative compound such as dibutyl methylenebisthioglycolate or the like; a glycerine derivative compound; an epoxy derivative compound; or a polymeric plasticizer such as a polyester compound, a polyether compound, a polyetherester compound or the like. Of these preferred are polymeric plasticizers having a molecular weight of 300 to 3,000 such as polyester compounds, polyether compounds and polyetherester compounds.

The plasticizer is added in an amount of 2 to 15 parts by weight per 100 parts by weight of the rubber. When it is used in an amount of less than 2 parts by weight, no sufficient improvement in low-temperature resistance is obtained. When the plasticizer is added in an amount of more than 15 parts by weight, reduction in tensile strength becomes large.

By further incorporating into the multi-component copolymer rubber of this invention a vinylidene fluoride polymer, a vinyl chloride resin, a nitrile rubber or a partially hydrogenated product thereof, or an acrylic rubber, a rubber composition can be produced which is excellent not only in gasoline resistance, gasohol resistance, sour gasoline resistance and sour gasohol resistance but also in ozone resistance, heat resistance and low-temperature resistance.

In this case, the multi-component copolymer rubber may consist essentially of (A) 10 to 69.5% by weight of a cyano-substituted alkyl (meth)acrylate,
(B) 30 to 89.5% by weight of an alkyl acrylate,
(C) 0.5 to 10% by weight of a crosslinkable monomer, and
(D) 0 to 10% by weight of other ethylenically unsaturated monomer copolymerizable with the components (A), (B) and (C).

The vinylidene fluoride polymer mentioned above includes a poly(vinylidene fluoride) as well as copolymers between vinylidene fluoride and ethylene trifluoride, propylene pentafluoride, propylene hexafluoride, vinyl acetate, ethylene, propylene, butadiene, styrene, an acrylic acid ester or the like wherein the content of vinylidene fluoride is usually at least 40 mole %, preferably at least 60 mole %. The degree of polymerization of the vinylidene fluoride polymer is not critical but is preferably 100 to 100,000.

The vinyl chloride resin mentioned above includes a poly(vinyl chloride) as well as copolymers between vinyl chloride and vinyl acetate, ethylene, propylene, butadiene, styrene or the like wherein the content of vinyl chloride is usually at least 60 mole % and preferably at least 80 mole %. The degree of polymerization of the vinyl chloride resin is not critical but is preferably 500 to 2,000.

As the amount of the vinylidene fluoride polymer or the vinyl chloride resin in the rubber composition increases, the resinous property of the rubber composition increases. Hence the upper limit of the amount of said polymer or resin is governed by this property, and is preferably 60 parts by weight or less.

The proportions of the multi-component copolymer rubber and the vinylidene fluoride polymer or the vinyl chloride resin in the rubber composition of this invention can be determined appropriately within the abovementioned ranges depending upon the application purpose and the performance requirements.

The mixing method in the preparation of the composition of this invention is not critical, but the following methods may be used:

(1) A method wherein a multi-component copolymer rubber and a vinylidene fluoride polymer or a vinyl chloride resin are blended by a mixer such as a roll, a Banbury mixer, an intermixer or the like.
(2) A method wherein a multi-component copolymer rubber and a vinylidene fluoride polymer or a vinyl chloride resin are blended in a latex or suspension state and then subjected to coagulation and subsequent coprecipitation.
(3) A method wherein the methods (1) and (2) are combined.

Into the multi-component copolymer rubber composition can optionally be incorporated conventional compounding chemicals such as a reinforcing agent, a filler, a plasticizer, a softener, a crosslinking agent, a stabilizer and the like. The resulting mixture can be subjected to crosslinking by a conventional method to easily obtain a crosslinked material.

The multi-component copolymer rubber composition of this invention is excellent not only is gasoline resistance, sour gasoline resistance, ozone resistance and heat resistance but also in new performance requirements, namely, gasohol resistance and sour gasohol resistance. In addition, the composition is good in tensile strength, elongation and low-temperature resistance. Therefore, the composition can be used in fuel system hoses of automobiles; other hoses, diaphragms and seals (e.g. gaskets, O-rings, oil seals) which come in contact with fuels, hydraulic oils, lubricating oils, etc.; rolls, transfer belts and conveyor belts requiring oil resistance and solvent resistance for use in iron manufacturing, spinning, printing, paper making, dyeing, etc.; and so forth. Utilizing the characteristic feature of the multi-component copolymer rubber composition being excellent in sour gasoline resistance and sour gasohol resistance, the composition can preferably be used in fuel system hoses of automobiles.

The acrylic rubber mentioned above is a multi-component copolymer rubber consisting of (A') 99.5 to 39.5% by weight of an alkyl acrylate, (B') 0 to 60% by weight of an alkoxyalkyl acrylate, (C') 0.5 to 10% by weight of at least one compound selected from the group consisting of diene compounds, (meth)acrylic acid esters containing a dihydrodicyclopentadienyl group, epoxy group-containing, ethylenically unsaturated compounds and active halogen-containing, ethylenically unsaturated compounds and (D') 0 to 10% by weight of other ethylenically unsaturated compound copolymerizable with (A'), (B') and (C'). The nitrile rubber mentioned above is a multi-component copolymer rubber composed of (A'') 20 to 90% by weight of a conjugated diolefin, (B'') 10 to 55% by weight of an $\alpha,\beta$-unsaturated nitrile, (C'') 0 to 70% by weight of an $\alpha,\beta$-unsaturated carboxylic acid ester and (D'') 0 to 20% by weight of at least one monomer selected from the group consisting of carboxyl group-containing monomers, epoxy group-containing monomers, hydroxyl group-containing monomers and amino group-containing monomers.

The alkyl acrylate which is the component (A') of the acrylic rubber is represented by the formula (II):

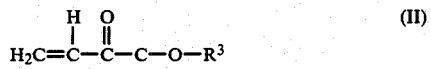

(II)

wherein $R^3$ is an alkyl group having 1 to 18 carbon atoms. Specific examples of the alkyl acrylate are as mentioned hereinbefore as to the component (B).

Specific examples of the alkoxyalkyl acrylate which is the component (B') of the acrylic rubber include methoxyethyl acrylate, ethoxyethyl acrylate and butoxyethyl acrylate.

As the component (C') of the acrylic rubber, there can be used the diene compounds, the (meth)acrylic acid esters containing a dihydroxypentadienyl group, the epoxy group-containing, ethylenically unsaturated compounds and the active halogen-containing, ethylenically unsaturated compounds, all of which have been mentioned with respect to the component (C) of the multi-component copolymer rubber of this invention.

The component (D'), namely, other ethylenically unsaturated compound copolymerizable with the components (A'), (B') and (C') may be various compounds. Specific examples of the component (D') include carboxyl group-containing compounds such as acrylic acid, methacrylic acid, crotonic acid, 2-pentanoic acid, maleic acid, fumaric acid, itaconic acid and the like; methacrylates such as methyl methacrylate, octyl methacrylate and the like; alkyl vinyl ketones such as methyl vinyl ketone and the like; alkenyl alkyl ethers such as vinyl ethyl ether, allyl methyl ether and the like; alkenyl aromatic compounds such as styrene, α-methylstyrene, chlorostyrene, vinyltoluene and the like; vinylnitriles such as acrylonitrile, methacrylonitrile and the like; vinylamides such as acrylamide, methacrylamide, N-methylolacrylamide and the like; vinyl chloride; vinylidene chloride; and alkyl fumarates.

The acrylic rubber used in this invention consists of 99.5 to 39.5% by weight of the component (A'), 0 to 60% by weight of the component (B'), 0.5 to 10% by weight of the component (C') and 0 to 10% by weight of the component (D'). When the component (A') is less than 39.5% by weight, the acrylic rubber has low heat-resistance. When the component (B') exceeds 60% by weight, the rubber has low heat-resistance. When the component (C') is less than 0.5% by weight, the rubber is insufficient in crosslinkability and poor in physical properties, particularly in normal physical properties such as permanent compression set. When the component (C') exceeds 10% by weight, the rubber has low heat-resistance. When the component (D') optionally used exceeds 10% by weight, the rubber has a poor balance between oil resistance and low-temperature resistance.

The mixing ratio of the acrylic rubber and the multi-component copolymer rubber of this invention is not critical. However, in order to improve the kneadability, vulanization speed, permanent compression set and gasoline resistance of the acrylic rubber, it is desirable to use 5% by weight or more of the latter rubber. When the multi-component copolymer rubber is used in an amount of less than 5% by weight, the effect is small. In order to improve the heat resistance of the multi-component copolymer rubber, it is preferable to use 10% by weight or more of the acrylic rubber. When the acrylic rubber is used in an amount of less than 10% by weight, the effect is small.

According to this invention, the processability, vulcanization speed and permanent compression set which are the drawbacks of the conventional acrylic rubber can be improved. At the same time, it is made possible to freely control the balance of gasoline resistance, heat resistance and low-temperature resistance, and design a polymer meeting any desired object. Therefore, this invention is highly beneficial to related industries and the multi-component copolymer rubber composition of this invention can widely be used in rolls, hoses, packings, seal materials, diaphragms, etc.

The conjugated diolefin which is the component (A") of the nitrile rubber mentioned above includes butadiene, isoprene, etc.

The α,β-unsaturated nitrile of the component (B") includes acrylonitrile, methacrylonitrile, etc.

The α,β-unsaturated carboxylic acid ester of the component (C") includes methyl, ethyl, n-butyl and 2-ethylhexyl esters of acrylic and methacrylic acids.

With respect to the component (D"), the carboxyl group-containing monomer includes specifically acrylic acid, methacrylic acid, maleic acid, fumaric acid, etc. The epoxy group-containing monomer includes glycidyl (meth)acrylate, glycidyl ether, vinyl glycidyl ehter, etc. The hydroxyl group-containing monomer includes 1-hydroxypropyl (meth)acrylate, 2-hydroxypropyl (meth)acrylate, hydroxyethyl (meth)acrylate, etc. The amino group-containing monomer includes dimethylaminoethyl (meth)acrylate, diethylaminoethyl (meth)acrylate, dibutylaminoethyl (meth)acrylate, etc.

The content of the conjugated diolefin (A") in the nitrile rubber is 20 to 90% by weight. When the content is less than 20% by weight, the rubber is insufficient in low-temperature resistance and mechanical properties. When the content exceeds 90% by weight, the rubber is poor in heat resistance and sour gasoline resistance. The conjugated diolefin (A") in the nitrile rubber may be partially hydrogenated.

The content of the α,β-unsaturated nitrile (B") in the nitrile rubber is 10 to 55% by weight. When the content is less than 10% by weight, the rubber is poor in oil resistance. When the content exceeds 55% by weight, the rubber is poor in low-temperature resistance.

The content of the α,β-unsaturated carboxylic acid ester (C") in the nitrile rubber is 0 to 70% by weight. When the content exceeds 70% by weight, the rubber has a low tensile strength.

The content of the monomer (D") in the nitrile rubber is 0 to 20% by weight. When the content exceeds 20% by weight, the rubber has inferior low-temperature resistance or low permanent compression set.

The mixing ratio of the multi-component copolymer rubber of this invention to the nitrile rubber is 20-99 to 80-1 (weight ratio), preferably 50-95 to 50-5. When the proportion of the mixed multi-component copolymer rubber of this invention is less than 20% by weight, the rubber composition is insufficient in heat resistance, sour gasoline resistance and ozone resistance. When the ratio exceeds 99% by weight, the crosslinking reaction of the rubber composition is slow, and the freedom of selectipon of vulcanizing agent is reduced.

The form of the nitrile rubber used can be either a solid or a liquid as long as its molecular weight is 0.01 dl/g or more in terms of intrinsic viscosity. The form may be a mixture of a solid and a liquid depending upon the application of the rubber composition. When the intrinsic viscosity is lower than 0.01 dl/g, the rubber composition is high in extract-ability with oil and is not desirable as a gasoline-resistant material. The Mooney vescosity ($ML_{1+4}$, 100° C.) of the nitrile rubber is preferably 20 to 80.

The rubber composition of this invention can be kneaded by a conventional mixing equipment such as a roll, a Banbury mixer, an extruder and other intermixers capable of mixing the components without excessively heating.

To the rubber composition of this invention comprising the multi-component copolymer rubber and the nitrile rubber can be added conventional compounding chemicals such as a filler (e.g. carbon black, calcium carbonate, a hydrocarbon resin, a phenolic resin), a vulcanizing agent, a vulcanizing adjuvant, an anti-aging agent, a softener and the like. The vulcanization of the rusulting mixture is usually conducted at 100° to 210° C. for about 0.5 to 120 min with heating by steam, a high temperature liquid or a microwave.

By superimposing a layer consisting of the multi-component copolymer rubber of this invention and a layer consisting of other rubber, a laminate excellent in sour gasoline resistance and sour gasohol resistance can be produced.

The other rubbers include butadiene-acrylonitrile rubber, styrene-butadiene rubber, fluororubber, polychloroprene, acrylic rubber, ethylenepropylene terpolymer (EPT), chlorinated polyethylene, chlorosulfonated polyethylene, silicone rubber, butyl rubber and epichlorohydrin rubber.

The layer consisting of the multi-component copolymer rubber of this invention and/or the layer consisting of the other rubbers may have incorporated thereinto an oxide or hydroxide of a metal of Groups II to IV of the Periodic Table for enhancing bonding strength. The oxide and the hydroxide include metal oxides such as magnesium oxide, aluminum oxide, zinc oxide, zinc dioxide, calcium oxide, lead (divalent and tetravalent) oxides and silicon dioxide and corresponding metal hydroxides. Of these, particularly preferred are magnesium oxide, calcium hydroxide, aluminum hydroxide and lead (divalent) oxide. The amount of the metal oxide or hydroxide added is usually 5 to 30 phr.

To the layer consisting of the multi-component copolymer rubber of this invention and the layer consisting of the other rubbers can be added conventional additives such as a reinforcing agent, a plasticizer, a processing adjuvant, a vulcanizing accelerator, a vulcanizing agent, an anti-aging agent and the like.

According to this invention, the layer consisting of the multi-component copolymer rubber of this invention and/or the layer consisting of the other rubbers may have incorporated thereinto an epoxy resin, a curing agent and a basic substance, and the two layers can be strongly vulcanization-bonded together. The vulcanizing agent may be a combination of maleic anhydride, phthalic anhydride, p-aminodiphenylamine, 2-methylimidazole and the like. The basic substance may be triethylamine, tetrabutylammonium chloride, or the lide. The abovementioned laminate can also be produced by bonding the above vulcanized layers to one another.

Since the laminate has a thin layer of the multi-component copolymer rubber of this invention excellent in sour gasoline resistance and sour gasohol resistance, the laminate is excellent not only in sour gasoline resistance and sour gasohol resistance but also in various rubber properties. Therefore, the laminate can largely contribute to related industries and be used in rolls, hoses, diaphragms, etc.

Next, this invention will be explained more specifically referring to Examples and the accompanying drawings; however, it should not be interpreted to be restricted to the Examples.

In the drawings, FIGS. 1 to 3 show infrared absorption spectra of polymers of Examples 1, 10 and 17, respectively. In the Examples and the Comparative Examples, parts are by weight.

EXAMPLES 1 TO 8 AND COMPARATIVE EXAMPLES 1 TO 6

Using the monomers shown in Table 1 and the following polymerization chemicals, polymerization reaction was conducted at 10° C. in an autoclave having an internal volume of 6 liters:

| Monomers (Details are shown in Table 1) | 100 parts |
|---|---|
| Water | 200 |
| Alkylsulfate type soap | 5 |
| Potassium phosphate | 0.2 |
| $FeSO_4 \cdot 7H_2O$ | 0.006 |
| Trisodium salt of ethylenediaminetetracetic acid | 0.020 |
| Sodium formaldehydesulfoxylate | 0.08 |
| p-Menthane hydroperoxide | 0.06 |

When a conversion as shown in Table 1 was reached, 0.2 part, per 100 parts of monomers, of hydroquinone was added to the polymerization system to terminate the polymerization.

Then, the polymerization mixture was heated, and unreacted monomers were removed under reduced pressure. To the residue was added an aqueous calcium chloride solution to coagulate polymer crumbs. The crumbs were water-washed and dried at 50° C. under reduced pressure, to prepare copolymer samples of Examples 1 to 8 and Comparative Examples 1 to 6.

Each copolymer sample was subjected to measurement of Mooney viscosity, copolymer composition and glass transition temperature. The results are shown in Table 1.

The infrared absorption spectrum of the polymer of Example 1 is shown in FIG. 1. Since this spectrum has a characteristic absorption of C≡N bond at 2,250 $cm^{-1}$ and a characteristic absorption of C═O bond of ester at 1,730 $cm^{-1}$ the presence of these two bonds in the polymer was confirmed. As shown in Table 1, this polymer has a single glass transition temperature (Tg) as measured by differential thermal analysis, which implies that the polymer is a copolymer.

[Test of characteristics of vulcanizate]

The copolymer samples shown in Table 1 were subjected to compounding in accordance with the following formulations:

[Examples 1, 3, 7 and 8 and Comparative Examples 2, 3 and 4]
(Crosslinking with organic peroxide)

| Copolymer | 100 parts |
|---|---|
| Stearic acid | 1 |
| HAF[1] carbon black | 50 |
| Peroximon F40[2] | 2 |

Note:
[1]High abrasion furnace black
[2]1,3-bis(t-butylperoxyisopropyl)benzene

[Examples 2, 4, 5 and 6 and Comparative Examples 1 and 5]
(Vulcanization with sulfur)

| Copolymer | 100 parts |
|---|---|
| Zinc oxide | 5 |
| Stearic acid | 1 |
| HAF carbon black | 50 |
| Accelerator TT[3] | 0.75 |
| Sulfur | 0.2 |

Note:
[3]Tetramethylthiuram disulfide

[Comparative Example 6]
(Butadiene-acrylonitrile rubber)

| Copolymer | 100 parts |
|---|---|
| Zinc oxide | 5 |
| Stearic acid | 1 |
| SRF[4] carbon black | 60 |
| DOP[5] | 5 parts |
| Accelerator TT[6] | 1.5 |
| Accelerator CZ[7] | 2 |
| Sulfur | 0.5 |

Note:
[4]Semi-reinforcing furnace black
[5]Dioctyl phthalate
[6]Tetramethylthiuram disulfide
[7]N—cyclohexyl-2-benzothiazolsulfenamide The compounds obtained were subjected to press-curing (at 180° C. for 20 min for Examples 1, 3, 7 and 8 and Comparative Examples 2, 3 and 4; at 170° C. for 20 min for Examples 2, 4, 5 and 6 and Comparative Examples 1 and 5; and at 160° C. for 20 min for Comparative Example 6) to obtain crosslinked rubbers.

Each crosslinked rubber was subjected to measurement of characteristics in accordance with JIS K 6301. The rubber was also subjected to measurement of sour gasoline resistance in accordance with the following test method.

[Test method for sour gasoline resistance]

A vulcanized rubber was immersed at 70° C. for 24 hr in a solution obtained by dissolving 1 g of lauryl peroxide in 99 g of Fuel C (a mixed solvent of isooctane:-toluene=1:1 by volume). This 1 cycle procedure was repeated 20 times (20 cycles). Then, the rubber was dried at 100° C. for 15 hr under reduced pressure and subjected to measurement of tensile strength and elongation at break in accordance with JIS K 6301. The changes of these properties after immersion compared with those before immersion were calculated and used as criteria of the sour gasoline resistance of the rubber. The results are shown in Table 1.

As is obvious from Table 1, each of the multi-component copolymer rubbers of this invention provides a crosslinked material which is excellent in gasoline resistance, sour gasoline resistance, heat resistance and ozone resistance, good in low-temperature resistance, tensile strength and elongation and small in permanent compression set.

TABLE 1

| | Example | | | | | | | | Comparative Example | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Monomers fed, parts | | | | | | | | | | | | | | Butadiene acrylonitrile rubber (Acrylonitrile content: 41% by weight) |
| Component (A) | | | | | | | | | | | | | | |
| 2-Cyanoethyl acrylate | 55 | 45 | 35 | 25 | 25 | 45 | | | 73 | 12 | | | 10 | |
| 4-Cyanobutyl acrylate | | | | | | | 50 | 40 | | | 75 | 13 | | |
| Component (B) | | | | | | | | | | | | | | |
| Ethyl acrylate | | | 30 | 60 | 53 | | 47 | 57 | | 85 | 22 | 84 | | |
| Butyl acrylate | 42 | 52 | 32 | 12 | 12 | 52 | 24 | | 24 | | | | 62 | |
| Component (C) | | | | | | | | | | | | | | |
| Ethylidenenorbornene | 3 | 3 | 3 | 3 | 3 | | 3 | 3 | 3 | 3 | 3 | 3 | | |
| Dihydrodicyclopentadienyl acrylate | | | | | | 1 | | | | | | | | |
| Component (D) | | | | | | | | | | | | | | |
| Methoxyethyl acrylate | | | | | 7 | | | | | | | | 25 | |
| Conversion, % | 84 | 87 | 80 | 89 | 90 | 92 | 78 | 81 | 83 | 88 | 82 | 90 | 85 | |
| Mooney viscosity: $ML_{1+4}$ 100° C. | 56 | 50 | 52 | 46 | 42 | 48 | 41 | 43 | 60 | 49 | 40 | 34 | 33 | |
| Copolymer composition, %*[1] | | | | | | | | | | | | | | |
| 2-Cyanoethyl acrylate | 56 | 47 | 35 | 26 | 26 | 45 | | | 73 | 14 | | | 10 | |
| 4-Cyanobutyl acrylate | | | | | | | 51 | 39 | | | 73 | 16 | | |
| Ethyl acrylate | | | 31 | 59 | 53 | | 46 | 58 | | 83 | 24 | 81 | | |
| Butyl acrylate | 41 | 50 | 31 | 12 | 12 | 51 | | | 24 | | | | 62 | |
| Ethylidenenorbornene | 3 | 3 | 3 | 3 | 3 | | 3 | 3 | 3 | 3 | 3 | 3 | 3 | |
| Dihydrodicyclopentadienyl acrylate | | | | | | 0 | 2 | | | | | | | |
| Methoxyethyl acrylate | | | | | 6 | 0 | | | | | | | 25 | |
| Glass transition temperature Tg, °C. | −20 | −27 | −24 | −20 | −22 | −28 | −28 | −27 | −7 | −16 | −33 | −22 | −41 | −22 |
| Kind of crosslinking agent*[2] | PO | S | PO | S | S | S | PO | PO | S | PO | PO | PO | S | S |
| Properties of crosslinked rubber | | | | | | | | | | | | | | |
| Tensile strength, kg/cm² | 145 | 129 | 139 | 124 | 122 | 120 | 134 | 121 | 97 | 123 | 88 | 94 | 81 | 196 |
| Elongation, % | 350 | 490 | 400 | 510 | 490 | 320 | 470 | 530 | 190 | 490 | 160 | 570 | 580 | 520 |
| Hardness, JIS-A | 74 | 72 | 70 | 68 | 68 | 73 | 66 | 64 | 81 | 67 | 69 | 63 | 55 | 73 |
| Gasoline resistance (After Fuel C) ΔV, % | +26 | +34 | +37 | +44 | +39 | +36 | +38 | +43 | +5 | +61 | +30 | +102 | +119 | +41 |
| Sour gasoline resistance (After immersion of 70° C. × 24 hr × 20 cycles in Fuel C containing 1% of lauryl peroxide) | | | | | | | | | | | | | | |

TABLE 1-continued

| | Example | | | | | | | | Comparative Example | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Change of tensile strength, % | −11 | −13 | −22 | −31 | −39 | −12 | −25 | −26 | −10 | −79 | −16 | −95 | −76 | −87 |
| Change of elongation, % | −17 | −31 | −35 | −12 | −33 | −24 | −39 | −46 | −15 | +32 | −21 | −72 | −88 | −96 |
| Heat resistance (150° C. × 72 hr aging with air heating) | | | | | | | | | | | | | | |
| Change of tensile strength, % | +4 | −7 | +2 | −3 | −8 | −10 | −15 | −11 | −12 | +6 | −9 | +13 | −45 | −81 |
| Change of elongation, % | −23 | −52 | −24 | −37 | −41 | −58 | −29 | −23 | −56 | −20 | −32 | −26 | −67 | −100 (No elongation) |
| Change of hardness, JIS-A | +9 | +12 | +11 | +10 | +11 | +12 | +14 | +12 | +15 | +8 | +13 | +11 | +13 | +23 |
| Ozone resistance, (500 pphm, 40° C., 30% elongation) | ← | ← | | | No cracking for 168 hr | | | | → | → | → | → | → | Cracks appeared in 2 hr |
| Low-temperature resistance: Gehman torsion test T100, °C. | +19 | +25 | −22 | −18 | −20 | −27 | −25 | −25 | −4 | −14 | −29 | −20 | −38 | −20 |
| Permanent compression set, 150° C. × 70 hr, % | 19 | 50 | 24 | 54 | 57 | 42 | 22 | 23 | 47 | 28 | 20 | 26 | 70 | 65 |

*[1] Analysis of copolymer components
Component (A)
Calculated from the nitrogen content measured by Kjeldahl method.
Components (B) and (D)
Calculated from the unreacted monomer amount in polymerization system measured by gas chromatography, using the following formula:

$$y_i = \frac{a_i - b_i}{A \times \frac{x}{100}} \times 100$$

$y_i$: % of component i in copolymer
$a_i$: Amount of component i fed
A: Amount of total monomers fed
x: Conversion
Component (C)
Measured by iodometry.
*[2] PO: Crosslinking by an organic peroxide
S: Vulcanization by sulfur

EXAMPLES 9 TO 14 AND COMPARATIVE EXAMPLES 7 TO 11

The copolymer samples of Examples 9 to 14 and Comparative Examples 7 to 11 were prepared by repeating the procedure of Examples 1 to 8, except that the monomers shown in Table 2 were used.

Each copolymer sample was subjected to measurement of Mooney viscosity, copolymer composition and glass transition temperature. The results are shown in Table 2.

The infrared absorption spectrum of the polymer of Example 10 is shown in FIG. 2. Since this spectrum has a characteristic absorption of C≡N bond at 2,250 cm$^{-1}$ and a characteristic absorption of C=O bond of ester at 1,730 cm$^{-1}$, the presence of these two bonds in the polymer was confirmed. As shown in Table 2, this polymer has a single glass transition temperature (Tg) as measured by differential thermal analysis, which implies that the polymer is a copolymer.

[Test of characteristics of vulcanizate]

The copolymer samples shown in Table 2 were subjected to compounding in accordance with the following formulations.

| (Examples 9 to 14 and Comparative Examples 7 to 9) | |
|---|---|
| Copolymer | 100 parts |
| Stearic acid | 1 |
| HAF[1] carbon black | 50 |
| Ammonium benzoate | 1 |

Note:
[1] High abrasion furnace black

| (Comparative Example 10) | |
|---|---|
| Copolymer | 100 parts |
| Stearic acid | 1 |
| HAF carbon black | 50 |
| Accelerator TRA[2] | 0.5 |
| Accelerator EUR[3] | 1 |
| Calcium stearate | 3 |

Note:
[2] Dipentamethylenethiuram hexasulfide
[3] 1,3-Diethylthiourea

| (Comparative Example 11) (Butadiene-acrylonitrile rubber) | |
|---|---|
| Copolymer | 100 parts |
| Zinc oxide | 5 |
| Stearic acid | 1 |
| SRF[4] carbon black | 60 |
| DOP[5] | 5 |
| Accelerator TT[6] | 1.5 |
| Accelerator CZ[7] | 2 |
| Sulfur | 0.5 |

Note:
[4] Semi-reinforcing furnace black
[5] Dioctyl phthalate
[6] Tetramethylthiuram disulfide
[7] N—cyclohexyl-2-benzothiazolsulfenamide The compounds obtained were subjected to press-curing (at 175° C. for 20 min for Examples 9 to 14 and Comparative Examples 7 to 10 and at 160° C. for 20 min for Comparative Example 11) to obtain crosslinked rubbers.

Each crosslinked rubber was subjected to measurement of characteristics in accordance with JIS K 6301. The rubber was also subjected to measurement of sour gasoline resistance in accordance with the same method as in Examples 1 to 8. The results are shown in Table 2.

As is obvious from Table 2, each of the multi-component copolymer rubbers of this invention provides a crosslinked material which is excellent in gasoline resistance, sour gasoline resistance, heat resistance and ozone resistance, good in low-temperature resistance, tensile strength and elongation and small in permanent compression set.

EXAMPLES 15 TO 19 AND COMPARATIVE EXAMPLES 12 TO 17

The copolymer samples of Examples 15 to 19 and Comparative Examples 12 to 17 were prepared by repeating the procedure of Examples 1 to 8, except that the monomers shown in Table 3 were used.

Each copolymer sample was subjected to measurement of Mooney viscosity, copolymer composition and

TABLE 2

| | Example | | | | | | Comparative Example | | | | |
|---|---|---|---|---|---|---|---|---|---|---|---|
| | 9 | 10 | 11 | 12 | 13 | 14 | 7 | 8 | 9 | 10 | 11 |
| Monomers fed, parts | | | | | | | | | | | Butadiene-acrylonitrile |
| Component (A) | | | | | | | | | | | rubber (Acrylonitrile |
| 2-Cyanoethyl acrylate | 45 | 35 | 35 | 25 | | | 75 | 10 | | 20 | content: 41% by weight) |
| 4-Cyanobutyl acrylate | | | | | 60 | 40 | | | 75 | | |
| Component (B) | | | | | | | | | | | |
| Ethyl acrylate | | 30 | 30 | 47 | 37 | 57 | | | 22 | 52 | |
| n-Butyl acrylate | 52 | 32 | 27 | 25 | | | 22 | 62 | | 25 | |
| Component (C) | | | | | | | | | | | |
| Allyl glycidyl ether | 3 | 3 | | 3 | 3 | 3 | 3 | 3 | 3 | | |
| Glycidyl methacrylate | | | 3 | | | | | | | | |
| Component (D) | | | | | | | | | | | |
| Vinyl chloroacetate | | | | 5 | | | | 25 | | | |
| 2-Methoxyethyl acrylate | | | | | | | | | | | |
| Conversion, % | 77 | 83 | 86 | 91 | 81 | 85 | 79 | 88 | 74 | 85 | |
| Mooney viscosity, $ML_{1+4}$, 100° C. | 41 | 44 | 45 | 50 | 36 | 39 | 57 | 37 | 35 | 42 | |
| Copolymer composition, %*[1] | | | | | | | | | | | |
| 2-Cyanoethyl acrylate | 46 | 36 | 35 | 25 | | | 76 | 10 | | 21 | |
| 4-Cyanobutyl acrylate | | | | | 61 | 41 | | | 76 | | |
| Ethyl acrylate | | 30 | 30 | 48 | 36 | 56 | 21 | | 21 | 52 | |
| n-Butyl acrylate | 51 | 31 | 25 | 24 | | | | 64 | | 25 | |
| Allyl glycidyl ether | 3 | 3 | | 3 | 3 | 3 | 3 | | 3 | | |
| Glycidyl methacrylate | | | 4 | | | | | | | | |
| Vinyl chloroacetate | | | | | | | | | 2 | | |
| 2-Methoxyethyl acrylate | | | 6 | | | | | 23 | | | |
| Glass transition temperature: Tg, °C. | −30 | −26 | −25 | −26 | −35 | −31 | −9 | −46 | −35 | −26 | −22 |
| Properties of crosslinked rubber | | | | | | | | | | | |
| Tensile strength, $kg/cm^2$ | 142 | 157 | 138 | 164 | 133 | 120 | 102 | 95 | 116 | 144 | 196 |
| Elongation, % | 450 | 360 | 300 | 420 | 490 | 530 | 110 | 570 | 170 | 480 | 520 |
| Hardness, Jis-A | 68 | 68 | 70 | 66 | 66 | 63 | 81 | 51 | 69 | 62 | 73 |
| Gasoline resistance (After) immersion in Fuel C at 40° C. for 48 hr) ΔV, % | +33 | +39 | +36 | +47 | +35 | +45 | +4 | +121 | +27 | +58 | +41 |
| Sour gasoline resistance (After immersion of 70° C. × 24 hr × 20 cycles in Fuel C containing 1% of lauroyl peroxide) | | | | | | | | | | | |
| Change of tensile strength, % | −18 | −28 | −26 | −41 | −17 | −19 | −6 | −72 | −13 | −91 | −87 |
| Change of elongation, % | −38 | −38 | −47 | −11 | −22 | −37 | −17 | −86 | −15 | −72 | −96 |
| Heat resistance (150° C. × 72 hr aging with air heating) | | | | | | | | | | | |
| Change of tensile strength, % | +3 | +6 | −11 | −2 | −14 | −8 | −10 | −39 | −20 | +2 | −81 |
| Change of elongation, % | −44 | −34 | −46 | −23 | −49 | −43 | −51 | −60 | −55 | −22 | −100 (No elongation) |
| Change of hardness, JIS-A | +13 | +12 | +13 | +9 | +15 | +13 | +14 | +15 | +18 | +7 | +23 |
| Ozone resistance, (500 pphm, 40° C., 30% elongation) | ← | ← | | | No cracking for 168 hr | | | | → | → | Cracks appeared in 2 hr |
| Low-temperature resistance: | | | | | | | | | | | |
| Gehman torsion test T100, °C. | −28 | −24 | −24 | −25 | −33 | −28 | −6 | −41 | −30 | −23 | −20 |
| Permanent compression set, 150° C. × 70 hr, % | 44 | 48 | 51 | 52 | 50 | 54 | 27 | 67 | 46 | 64 | 65 |

*[1]Analysis of copolymer components
Cyanoalkyl acrylates:
Calculated from the nitrogen content measured by Kjeldahl method.
Alkyl acrylates and other monomers:
Calculated from the unreacted monomer amount in polymerization system measured by gas chromatography, using the following formula.

$$y_i = \frac{a_i - b_i}{A \times \frac{x}{100}} \times 100$$

$y_i$: % of component i in copolymer
$a_i$: Amount of component i fed
$b_i$: Amount of component i unreacted
x: Conversion glass transition temperature. The results are shown in Table 3.

The infrared absorption spectrum of the copolymer of Example 17 is shown in FIG. 3. Since this spectrum has a characteristic absorption of C≡N bond at 2,250 cm$^{-1}$ and a characteristic absorption of C=O bond of ester at 1,730 cm$^{-1}$, the presence of these two bonds in the copolymer was confirmed. As shown in Table 3, this copolymer has a single glass transition temperature (Tg) as measured by differential thermal analysis, which implies that the product is a copolymer.

[Test of characteristics of vulcanizate]

The copolymer samples shown in Table 2 were subjected to compounding in accordance with the following formulations.

[Examples 15 to 19 and Comparative Examples 12 to 16]

The same formulation as in Comparative Example 10.

[Comparative Example 17]

The same formulation as in Comparative Example 11.

The compounds obtained were subjected to press-curing (at 175° C. for 20 min for Examples 15 to 19 and Comparative Examples 12 to 16 and at 160° C. for 20 min for Comparative Example 17) to obtain crosslinked rubbers.

Each crosslinked rubber was subjected to measurement of characteristics in accordance with JIS K 6301. The rubber was also subjected to measurement of sour gasoline resistance in accordance with the same method as in Examples 1 to 8.

As is obvious from Table 3, each of the multi-component copolymer rubbers of this invention provides a crosslinked material which is excellent in gasoline resistance, sour gasoline resistance, heat resistance and ozone resistance, good in low temperature resistance, tensile strength and elongation and small in permanent compression set.

TABLE 3

|  | Example | | | | | Comparative Example | | | | | |
| --- | --- | --- | --- | --- | --- | --- | --- | --- | --- | --- | --- |
|  | 15 | 16 | 17 | 18 | 19 | 12 | 13 | 14 | 15 | 16 | 17 |
| Monomers fed, parts | | | | | | | | | | | Butadiene-acrylonitrile rubber (Acrylonitrile content: 41% by weight) |
| Cyano-substituted alkyl acrylates | | | | | | | | | | | |
| 2-Cyanoethyl acrylate | 55 | 35 | 45 | | | 73 | 10 | | | 0.5 | |
| 4-Cyanobutyl acrylate | | | | 50 | 40 | | | 75 | 20 | | |
| Alkyl acrylates | | | | | | | | | | | |
| Ethyl acrylate | | 30 | | 47 | 57 | | | 22 | 77 | 20.5 | |
| Butyl acrylate | 42 | 32 | 52 | | | 24 | 62 | | | 78 | |
| Other comonomers | | | | | | | | | | | |
| Vinylbenzyl chloride | 3 | 3 | | | | 3 | 3 | | | | |
| Vinyl chloroacetate | | | 3 | 3 | 3 | | | 3 | 3 | 1 | |
| Methoxyethyl acrylate | | | | | | | 25 | | | | |
| Conversion, % | 86 | 81 | 81 | 88 | 85 | 78 | 88 | 82 | 84 | 83 | |
| Mooney viscosity, ML$_{1+4}$, 100° C. | 47 | 42 | 49 | 37 | 40 | 54 | 36 | 33 | 31 | 2.9 | |
| Copolymer composition, %*$^1$ | | | | | | | | | | | |
| 2-Cyanoethyl acrylate | 55 | 35 | 47 | | | 74 | 11 | | | 0.5 | |
| 4-Cyanobutyl acrylate | | | | 53 | 42 | | | 74 | 20 | | |
| Ethyl acrylate | | 31 | | 45 | 56 | | | 24 | 78 | 21.5 | |
| Butyl acrylate | 42 | 32 | 51 | | | 23 | 61 | | | 77 | |
| Vinylbenzyl chloride | 3 | 2 | | | | 3 | 3 | | | | |
| Vinyl chloroacetate | | | 2 | 2 | 2 | | | 2 | 2 | | |
| Methoxyethyl acrylate | | | | | | | 25 | | | 1 | |
| Glass transition temperature: Tg, °C. | −20 | −24 | −28 | −31 −29 | −10 | −43 | −35 | −25 | −46 | −22 | |
| Properties of crosslinked rubber | | | | | | | | | | | |
| Tensile strength, kg/cm$^2$ | 159 | 145 | 164 | 151 | 138 | 109 | 86 | 121 | 117 | 56 | 196 |
| Elongation, % | 290 | 410 | 460 | 480 | 550 | 130 | 540 | 180 | 620 | 610 | 520 |
| Hardness, JIS-A | 70 | 64 | 66 | 65 | 63 | 77 | 52 | 68 | 61 | 50 | 73 |
| Gasoline resistance After immersion in Fuel C at 40° C. for 48 hr ΔV, % | +28 | +42 | +35 | +38 | +44 | +4 | +117 | +29 | +85 | +190 | +41 |
| Sour gasoline resistance (After immersion of 70° C. × 24 hr × 20 cycles in Fuel C containing 1% of lauroyl peroxide) | | | | | | | | | | | |
| Change of tensile strength, % | −21 | −32 | −23 | −29 | −29 | −8 | −83 | −14 | −94 | Impossible to measure due to high softness | −87 |
| Change of elongation, % | −32 | −45 | −26 | −39 | −44 | −20 | −85 | −21 | −67 | | −96 |
| Heat resistance (150° C. × 72 hr aging with air heating) | | | | | | | | | | | |
| Change of tensile strength, % | −6 | +1 | −4 | −16 | −10 | +23 | −41 | −21 | +25 | +11 | −81 |
| Change of elongation, % | −44 | −38 | −47 | −47 | −39 | −51 | −63 | −54 | −30 | −24 | −100 (No elongation) |
| Change of hardness, JIS-A | +8 | +13 | +10 | +15 | +14 | +18 | +14 | +19 | +9 | +8 | +23 |
| Ozone resistance (500 pphm, 40° C., 30% elongation) | ← | | No cracking for 168 hr | | | | → | → | → | | Cracks appeared in 2 hr |
| Low-temperature resistance: | | | | | | | | | | | |
| Gehman torsion test T100, °C. | −17 | −22 | −25 | −29 | −26 | −7 | −37 | −31 | −22 | −42 | −20 |
| Permanent compression set, | 49 | 56 | 53 | 52 | 55 | 42 | 68 | 47 | 62 | 57 | 65 |

TABLE 3-continued

|  | Example | | | | | Comparative Example | | | | | |
| --- | --- | --- | --- | --- | --- | --- | --- | --- | --- | --- | --- |
|  | 15 | 16 | 17 | 18 | 19 | 12 | 13 | 14 | 15 | 16 | 17 |
| 150° C. × 70 hr, % | | | | | | | | | | | |

*[1] Analysis of copolymer components
Cyanoalkyl acrylates:
Calculated from the nitrogen content measured by Kjeldahl method.
Alkyl acrylates and other monomers:
Calculated from the unreacted monomer amount in polymerization system measured by gas chromatography, using the following formula:

$$yi = \frac{ai - bi}{A \times \frac{x}{100}} \times 100$$

yi: % of component i in copolymer
ai: Amount of component i fed
bi: Amount of compound i unreacted
x: Conversion

EXAMPLES 20 TO 25 AND COMPARATIVE EXAMPLE 18

The copolymers shown in Table 4 were subjected to compounding in accordance with the formulations shown in Table 5 and kneaded by a roll to obtain unvulcanized rubber compounds. These unvulcanized rubber compounds were subjected to press-curing (at 175° C. for 20 min for Examples 20 to 25 and at 160° C. for 20 min for Comparative Example 18) to obtain vulcanized rubbers. The vulcanized rubbers were subjected to measurement of characteristics in accordance with JIS K 6301. The rubbers were also subjected to measurement of sour gasoline resistance by the same method as in Examples 1 to 8.

As is obvious from Table 4, the vulcanized rubber compositions of this invention are excellent in sour gasoline resistance and heat resistance and good in tensile strength and elongation.

TABLE 4

|  | Example | | | | | | Comparative Example |
| --- | --- | --- | --- | --- | --- | --- | --- |
|  | 20 | 21 | 22 | 23 | 24 | 25 | 18 |
| Copolymer composition, %*[1] | | | | | | | Butadiene-acrylonitrile rubber (Acrylonitrile content: 41% by weight) |
| 2-Cyanoethyl acrylate | 57 | 46 | 36 | 47 | | | |
| 4-Cyanobutyl acrylate | | | | | 53 | 42 | |
| Ethyl acrylate | | | 30 | | 45 | 56 | |
| Butyl acrylate | 40 | 51 | 31 | 51 | | | |
| Allyl glycidyl ether | 3 | 3 | 3 | | | | |
| Vinyl chloroacetate | | | | 2 | 2 | 2 | |
| Crosslinking agents, parts | | | | | | | |
| Hexamethylenetetramine | 0.5 | | | | | | |
| Zinc dimethyldithiocarbamate | | 0.3 | | | | | |
| Potassium stearate | | | 2.5 | 0.5 | | | |
| Sodium stearate | | | 1 | 2.5 | | | |
| Sulfur | | | 0.2 | 0.3 | | | |
| Ammonium benzoate | | | | | 3 | | |
| Hexamethylenediamine carbamate | | | | | | 0.5 | |
| Properties of crosslinked rubber | | | | | | | |
| Tensile strength, kg/cm² | 160 | 138 | 165 | 171 | 160 | 141 | 196 |
| Elongation, % | 300 | 470 | 380 | 450 | 430 | 560 | 520 |
| Hardness, JIS-A | 70 | 67 | 68 | 67 | 64 | 62 | 73 |
| Sour gasoline resistnace (After immersion of 70° C. × 24 hr × 20 cycles in Fuel C containing 1% of lauroyl peroxide) | | | | | | | |
| Change of tensile, strength, % | −13 | −20 | −25 | −17 | −30 | −27 | −87 |
| Change of elongation, % | −25 | −39 | −40 | −22 | −37 | −41 | −96 |
| Heat resistance (150° C. × 72 hr aging with air heating) | | | | | | | |
| Change of tensile strength, % | −5 | +2 | +5 | +2 | −7 | −8 | −81 |
| Change of elongation, % | −43 | −45 | −30 | −41 | −46 | −43 | −100 (No elongation) |
| Change of hardness, JIS-A | +12 | +13 | +10 | +10 | +11 | +14 | +23 |

*[1] Analysis of copolymer components
Cyanoalkyl acrylates:
Calculated from the nitrogen content measured by Kjeldahl method.
Alkyl acrylates and other monomers:
Calculated from the unreacted monomer amount in polymerization system measured by gas chromatography, usong the following formula:

$$yi = \frac{ai - bi}{A \times \frac{x}{100}} \times 100$$

yi: % of content i in copolymer
ai: Amount of component i fed
bi: Amount of component i unreacted
x: Conversion

TABLE 5

| Compound formulation | |
| --- | --- |
| Examples 20 to 25 | |
| Polymer | 100 parts |
| HAF carbon black | 50 |

TABLE 5-continued

| Compound formulation | |
| --- | --- |
| Stearic acid | 1 |
| Crosslinking agent | Shown in Table 1 |
| Comparative Example 18 | |
| Polymer | 100 parts |
| Zinc oxide | 5 |
| Stearic acid | 1 |
| SRF carbon black | 60 |
| DOP | 5 |
| Vulcanization accelerator TT[*1] | 1.5 |
| Vulcanization accelerator CZ[*2] | 2 |
| Sulfur | 0.5 |

*[1]Tetramethylthiuram disulfide
*[2]N—cyclohexyl-2-benzothiazolsulfenamide

EXAMPLES 26 TO 34 AND COMPARATIVE EXAMPLES 19 TO 23

Using the monomers shown in Table 7 and the following polymerization chemicals, polymerization reaction was conducted at 10° C. in an autoclave having an internal volume of 6 liters:

| Monomers (Details are shown in Table 7) | 100 parts |
| --- | --- |
| Water | 200 |
| Alkylsulfate type soap | 5 |
| Potassium phosphate | 0.2 |
| FeSO$_4$.7H$_2$O | 0.006 |
| Trisodium salt of ethylenediaminetetracetic acid | 0.020 |
| Sodium formaldehydesulfoxylate | 0.08 |
| p-Menthane hydroperoxide | 0.06 |

When a conversion shown in Table 7 was obtained, 0.2 part of hydroquinone per 100 parts of monomer was added to the polymerization system to terminate the polymerization.

Then, the polymerization mixture was heated, and the unreacted monomers were removed under reduced pressure. To the residue was added an aqueous calcium chloride solution to coagulate polymer crumbs. The crumbs were water-washed and dried at 50° C. under reduced pressure, whereby the copolymers of Examples 26 to 34 and Comparative Examples 19 to 23 were prepared. These copolymers were compounded with the formulations show in Table 6 and kneaded by a Banbury mixer. The kneaded compounds were subjected to evaluation of processability from dischargability from Banbury mixer as well as from knitting performance, and good processability was indicated as o, and bad processability as X.

The compounded rubbers obtained were subjected to press-curing at 175° C. for 20 min to obtain vulcanized rubbers. The vulcanized rubbers were subjected to measurement of characteristics in accordance with JIS K 6301. These rubbers were also subjected to measurement of sour gasoline resistance in accordance with the following method.

[Test method for sour gasoline resistance]

A vulcanized rubber was immersed at 70° C. for 24 hr in a solution obtained by dissolving 1 g of lauryl peroxide in 99 g of Fuel C (a mixed solvent of isooctane:toluene=1:1 by volume). This 1 cycle procedure was repeated 20 times (20 cycles). Then, the rubber was dried at 100° C. for 15 hr under reduced pressure and subjected to measurement of tensile strength and elongation in accordance with JIS K 6301. The change (%) of the value obtained after immersion relative to the value obtained before immersion was calculated and used as criteria of the sour gasoline resistance of the rubber. The results are shown in Table 7.

As is obvious from Table 7, the multi-component copolymer rubbers of this invention have good kneadability and the vulcanized rubbers obtained therefrom are excellent in sour gasoline resistance and heat resistance and good in tensile strength and elongation.

TABLE 6

|  | A | B | C | D | E | F | G | H | I | J |
| --- | --- | --- | --- | --- | --- | --- | --- | --- | --- | --- |
| Copolymer | 100 | 100 | 100 | 100 | 100 | 100 | 100 | 100 | 100 | 100 |
| Stearic acid | 1 | 1 | 5 | 1 | 1 | 1 | 1 | 1 | 1 | 1 |
| HAF carbon black | 50 | 50 | 50 | 50 | 50 | 50 | 50 | 50 | 50 | 50 |
| Ammonium benzoate | 1 | 1 | 1 | 1 | 1 | 1 | 1 | 1 | 1 | 1 |
| TE-80[*1] | 3 | 1 |  |  |  |  | 0.2 | 15 |  | 3 |
| Paraffin wax[*2] |  |  |  | 5 |  |  |  |  |  |  |
| VANFRE AP-2[*3] |  |  |  |  | 3 |  |  |  |  |  |
| GAFAC RL 210[*4] |  |  |  |  |  | 3 |  |  |  |  |
| RS 700[*5] |  |  |  |  |  |  |  |  | 5 |  | o[1]Sodium salt of a fatty acid, manufactured by Du Pont
*[2]Hydrocarbon type compound
*[3]Fatty acid ester type compound, manufactured by IPPOSHA OIL INDUSTRY CO., LTD.
*[4]Phosphoric acid ester type compound, manufactured by Toho Chemical Industries Co., Ltd.
*[5]Polyetherester compound (plasticizer)

TABLE 7

|  | Example | | | | | | | | Comparative Example | | | | | Example |
| --- | --- | --- | --- | --- | --- | --- | --- | --- | --- | --- | --- | --- | --- | --- |
|  | 26 | 27 | 28 | 29 | 30 | 31 | 32 | 33 | 19 | 20 | 21 | 22 | 23 | 34 |
| Monomers fed, parts | | | | | | | | | | | | | | |
| Component (A) | | | | | | | | | | | | | | |
| 2-Cyanoethyl acrylate | 45 | 35 |  | 45 | 45 | 45 | 45 | 45 | 45 | 45 | 45 | 35 |  | 45 |
| 4-Cyanobutyl acrylate |  |  | 60 |  |  |  |  |  |  |  |  |  | 60 |  |
| Component (B) | | | | | | | | | | | | | | |
| Ethyl acrylate |  | 30 | 37 |  |  |  |  |  |  |  |  | 30 | 37 |  |
| n-Butyl acrylate | 52 | 27 |  | 52 | 52 | 52 | 52 | 52 | 52 | 52 | 52 | 27 |  | 52 |
| Component (C) | | | | | | | | | | | | | | |
| Allyl glycidyl ether | 3 |  | 3 | 3 | 3 | 3 | 3 | 3 | 3 | 3 | 3 |  | 3 | 3 |
| Glycidyl methacrylate |  | 3 |  |  |  |  |  |  |  |  |  | 3 |  |  |

TABLE 7-continued

|  | Example |  |  |  |  |  |  |  | Comparative Example |  |  |  |  | Example |
|---|---|---|---|---|---|---|---|---|---|---|---|---|---|---|
|  | 26 | 27 | 28 | 29 | 30 | 31 | 32 | 33 | 19 | 20 | 21 | 22 | 23 | 34 |
| Component (D) | | | | | | | | | | | | | | |
| Vinyl chloroacetate |  | 5 |  |  |  |  |  |  |  |  |  | 5 |  |  |
| 2-Methoxyethyl acrylate | | | | | | | | | | | | | | |
| Conversion, % | 77 | 86 | 81 | 77 | 77 | 77 | 77 | 77 | 77 | 77 | 77 | 86 | 81 | 77 |
| Mooney viscosity, $ML_{1+4}$, 100° C. | 41 | 45 | 36 | 41 | 41 | 41 | 41 | 41 | 41 | 41 | 41 | 45 | 36 | 41 |
| Copolymer composition, %*[1] | | | | | | | | | | | | | | |
| 2-Cyanoethyl acrylate | 46 | 35 |  | 46 | 46 | 46 | 46 | 46 | 46 | 46 | 46 | 35 |  | 46 |
| 4-Cyanobutyl acrylate |  |  | 61 |  |  |  |  |  |  |  |  |  | 61 |  |
| Ethyl acetate |  | 30 | 36 |  |  |  |  |  |  |  |  | 30 | 36 |  |
| n-Butyl acrylate | 51 | 25 |  | 51 | 51 | 51 | 51 | 51 | 51 | 51 | 51 | 25 |  | 51 |
| Allyl glycidyl ether | 3 |  | 3 | 3 | 3 | 3 | 3 | 3 | 3 | 3 | 3 |  | 3 | 3 |
| Glycidyl methacrylate |  | 4 |  |  |  |  |  |  |  |  |  | 4 |  |  |
| Vinyl chloroacetate |  | 6 |  |  |  |  |  |  |  |  |  | 6 |  |  |
| 2-Methoxyethyl acetate | | | | | | | | | | | | | | |
| Glass transition temperature Tg, °C. | −30 | −25 | −35 | −30 | −30 | −30 | −30 | −30 | −30 | −30 | −30 | −25 | −35 | −30 |
| Compound formulation | A | A | A | B | C | D | E | F | G | H | I | I | I | J |
| Processability | o | o | o | o | o | o | o | o | x | o | x | x | x | o |
| Properties of crosslinked rubber | | | | | | | | | | | | | | |
| Tensile strength, kg/cm$^2$ | 138 | 132 | 130 | 140 | 137 | 139 | 138 | 120 | 142 | 85 | 142 | 138 | 133 | 130 |
| Elongation, % | 460 | 330 | 520 | 450 | 470 | 480 | 480 | 530 | 450 | 610 | 450 | 300 | 490 | 500 |
| Hardness, JIS-A | 66 | 67 | 65 | 67 | 68 | 67 | 67 | 65 | 68 | 58 | 68 | 70 | 66 | 63 |
| Gasoline resistance (After immersion of 40° C. × 48 hr in Fuel C ΔV, % | +26 | +30 | +28 | +30 | +30 | +31 | +30 | +28 | +31 | +23 | +33 | +36 | +35 | +21 |
| Sour gasoline resistance (After immersion of 70° C. × 24 hr × 20 cycles in Fuel C containing 1% of lauroyl peroxide | | | | | | | | | | | | | | |
| Change of tensile strength, % | −14 | −19 | −15 | −17 | −20 | −15 | −14 | −20 | −17 | −23 | −18 | −26 | −17 | −10 |
| Change of elongation, % | −35 | −35 | −25 | −39 | −40 | −35 | −40 | −42 | −40 | −45 | −48 | −47 | −22 | −32 |
| Heat resistance (150° C. × 72 hr) aging with air heating) | | | | | | | | | | | | | | |
| Change of tensile strength, % | −1 | −7 | −10 | −2 | +5 | −5 | −7 | −1 | +2 | −7 | +3 | −11 | −14 | +5 |
| Change of elongation, % | −48 | −48 | −51 | −43 | −46 | −48 | −48 | −47 | −45 | −51 | −44 | −46 | −49 | −50 |
| Change of hardness, JIS-A | +15 | +15 | +17 | +14 | +14 | +14 | +14 | +15 | +13 | +18 | +13 | +13 | +15 | +17 |
| Ozone resistance (50 pphm, 40° C., 30% elongation | ← | ← | ← | ← | ← | No cracking for 168 hr | | | | | | | → | → |
| Low-temperature resistance: | | | | | | | | | | | | | | |
| Gehman torsion test T100, °C. | −30 | −25 | −35 | −29 | −28 | −29 | −29 | −30 | −28 | −33 | −28 | −24 | −33 | −36 |
| Permanent compression set, 150° C. × 70 hr, % | 45 | 52 | 52 | 44 | 45 | 46 | 45 | 46 | 44 | 54 | 44 | 51 | 50 | 47 |

*[1] Analysis of copolymer components
Component (A)
Calculated from the nitrogen content by Kjeldhl method.
Components (B) and (C)
Calculated from the unreacted monomer amount in polymerization system measured by gas chromatography, using the following formula:

$$y_i = \frac{a_i - b_i}{A \times \frac{x}{100}} \times 100$$

$y_i$: % of component i in copolymer
$a_i$: Amount of component i fed
$b_i$: Amount of component i unreacted
A: Amount of total monomers fed
x: Conversion
Component (C)
Measured by iodometry.

EXAMPLES 35 TO 42 AND COMPARATIVE EXAMPLES 24 TO 28

Each polymer composition sample consisting of a multi-component copolymer rubber and a fluororubber whose formulation is shown in the upper section of Table 9 was compounded by a Banbury mixer with the formulation shown in Table 8. Each compound obtained was press-cured under the conditions shown in the lower section of Table 8.

The crosslinked rubber compositions thus obtained were subjected to measurement of characteristics in accordance with JIS K 6301.

These rubber compositions were also subjected to sour gasoline resistance and sour gasohol resistance in accordance with the following method.

[Test method for sour gasoline resistance]

A test specimen of a crosslinked rubber composition was immersed at 40° C. for 72 hr in a solution obtained by dissolving 2.5 g of lauryl peroxide in 97.5 g of Fuel C (a mixed solvent consisting of equal volumes of isooctane and toluene). This 1 cycle procedure was repeated n times (n cycles). After each cycle, the test specimen was taken out, dried at 100° C. for 15 hr under reduced pressure and bent at an angle of 180° to observe formation of cracks.

[Test method for sour gasohol resistance]

This resistance was measured by the same method as in the case of sour gasoline resistance, except that Fuel C was replaced by a mixed solvent consisting of 80 parts by volume of Fuel C and 20 parts by volume of ethanol.

The measurement results are shown in the lower section of Table 9.

As is obvious from Table 9, the multi-component copolymer rubber compositions of this invention are excellent not only in gasoline resistance, gasohol resistance, sour gasoline resistance, sour gasohol resistance, ozone resistance and heat resistance but also in tensile strength, elongation and balance between gasoline resistance and low-temperature resistance.

TABLE 8

|  | Compound Symbol | | | | |
| --- | --- | --- | --- | --- | --- |
|  | K | L | M | N | O |
| Polymer composition | 100.0 | 100.0 | 100.0 | 100.0 | 100.0 |
| Zinc oxide | 5.0 | | | | |
| Stearic acid | 1.0 | 1.0 | 1.0 | 1.0 | 1.0 |
| HAF carbon black*[1] | 20.0 | 20.0 | 20.0 | 20.0 | 60.0 |
| Processing aid TE-80*[2] | 1.0 | 1.0 | 1.0 | 1.0 | 1.0 |
| Accelerator TT*[3] | 0.75 | | | | |
| Accelerator TRA*[4] | | | | 0.5 | |
| Accelerator EUR*[5] | | | | 1.0 | |
| Sulfur | 0.2 | | | | |
| Peroximon F40*[6] | | 2.0 | | | |
| Ammonium benzoate | | | 2.0 | | 2.0 |
| Potassium stearate | | | | 3.0 | |
| Conditions for press-curing | 165° C. × 30 min | 180° C. × 20 min | 165° C. × 30 min | 175° C. × 20 min | 165° C. × 30 min |

*[1]High abrasion furnace black
*[2]Metal salt of a fatty acid, manufactured by Technical Processing Co.
*[3]Tetramethylthiuram disulfide
*[4]Dipentamethylenethiuram hexasulfide
*[5]1,3-Diethylthiourea
*[6]1,3-Bis(t-butylperoxyisopropyl)benzene

TABLE 9

|  | Example | | | | | | | | Comparative Example | | | | |
| --- | --- | --- | --- | --- | --- | --- | --- | --- | --- | --- | --- | --- | --- |
|  | 35 | 36 | 37 | 38 | 39 | 40 | 41 | 42 | 24 | 25 | 26 | 27 | 28 |
| Multi-component copolymer rubber, parts | 70 | 70 | 70 | 70 | 70 | 70 | 90 | 50 | 70 | 70 | 97 | 70 | 100 |
| Component (A) composition (%) | | | | | | | | | | | | | |
| 2-Cyanoethyl acrylate | 56 | 35 | 25 | 25 | | 25 | 25 | 25 | | 86 | 25 | 25 | 25 |
| 4-Cyanobutyl acrylate | | | | | 42 | | | | | | | | |
| Component (B) composition (%) | | | | | | | | | | | | | |
| Ethyl acrylate | | 31 | 53 | 47 | 56 | 47 | 47 | 47 | 97 | | 47 | 47 | 47 |
| n-Butyl acrylate | 41 | 31 | 12 | 25 | | 25 | 25 | 25 | | 11 | 25 | 25 | 25 |
| Component (C) composition (%) | | | | | | | | | | | | | |
| Ethylidenenorbornene | 3 | 3 | 3 | | | | | | 3 | 3 | | | |
| Allyl glycidyl ether | | | | 3 | | 3 | 3 | 3 | | | 3 | | 3 |
| Vinyl chloroacetate | | | | | 2 | | | | | | | 3 | |
| Component (D) composition (%) | | | | | | | | | | | | | |
| Methoxyethyl acrylate | | | | 7 | | | | | | | | | |
| Fluororubber, parts | | | | | | | | | | | | | |
| JSR KYNAR 731*[1] | 30 | 30 | 30 | 30 | 30 | | 10 | 50 | 30 | 30 | 3 | | |
| VITON GF*[2] | | | | | | 30 | | | | | | | |
| JSR AFLAS*[3] | | | | | | | | | | | | 30 | |
| Compound symbol*[4] | K | L | K | M | N | O | M | M | K | K | O | O | M |
| Properties of crosslinked rubber | | | | | | | | | | | | | |
| Tensile strength, kg/cm$^2$ | 210 | 202 | 198 | 195 | 193 | 155 | 165 | 240 | 185 | 121 | 151 | 150 | 150 |
| Elongation, % | 250 | 265 | 270 | 265 | 275 | 350 | 320 | 190 | 255 | 150 | 350 | 370 | 350 |
| Hardness, JIS-A | 71 | 70 | 69 | 72 | 71 | 72 | 65 | 75 | 72 | 75 | 66 | 73 | 66 |
| Gasoline resistance (After immersion of 40° C. × 48 hr in Fuel C) | | | | | | | | | | | | | |
| ΔV, % | +8 | +15 | +27 | +32 | +41 | +35 | +45 | +25 | +105 | +3 | +48 | +60 | +49 |
| Gasohol resistance (After immersion of 40° C. × 48 hr in a solution of Fuel C/ethanol = 80/20) | | | | | | | | | | | | | |
| ΔV, % | +26 | +35 | +55 | +67 | +67 | +80 | +85 | +49 | +150 | +11 | +130 | +97 | +132 |
| Sour gasoline resistance (After immersion of 40° C. × 72 hr × n cycles in Fuel C containing 2.5% of lauroyl peroxide) | | | | | | | | | | | | | |
| n = 3 (3 cycles) | NC*[5] | NC | NC | NC | NC | NC | NC | NC | Softened | NC | NC | NC | NC |
| n = 10 (10 cycles) | NC | NC | NC | NC | NC | NC | NC | NC | Softened | NC | NC | NC | NC |

Sour gasohol resistance (After immersion of 40° C. × 72 hr × n cycles in a solution consisting of 80 volume % of Fuel C containing 2.5% of lauroyl peroxide and 20 volume % of ethanol)

|  | 35 | 36 | 37 | 38 | 39 | 40 | 41 | 42 | 24 | 25 | 26 | 27 | 28 |
| --- | --- | --- | --- | --- | --- | --- | --- | --- | --- | --- | --- | --- | --- |
| n = 3 (3 cycles) | NC | NC | NC | NC | NC | NC | NC | NC | Softened | NC | NC | NC | NC |
| n = 6 (6 cycles) | NC | NC | NC | NC | NC | NC | NC | NC | Softened | NC | NC | NC | NC |

TABLE 9-continued

|  | Example | | | | | | | | Comparative Example | | | | |
| --- | --- | --- | --- | --- | --- | --- | --- | --- | --- | --- | --- | --- | --- |
|  | 35 | 36 | 37 | 38 | 39 | 40 | 41 | 42 | 24 | 25 | 26 | 27 | 28 |
| n = 10 (10 cycles) | NC | NC | NC | NC | NC | NC | NC | NC | Softened | NC | NC | NC | NC |
| Heat resistance (150° C. × 72 hr aging with air heating) | | | | | | | | | | | | | |
| Change of tensile strength, % | +3 | +1 | +6 | +5 | +2 | +5 | +10 | +1 | +12 | +1 | +11 | +5 | +12 |
| Change of elongation, % | −40 | −31 | −19 | −22 | −23 | −38 | −45 | −19 | −16 | −80 | −59 | −45 | −59 |
| Change of hardness, JIS-A | +6 | +5 | +3 | +2 | +4 | +10 | +4 | +3 | +5 | +18 | +5 | +12 | +6 |
| Ozone resistance, static (80 pphm, 40° C., 100% elongation) | | | | | | | | | | | | | |
| 24 hr | NC | NC | NC | NC | NC | NC | NC | NC | NC | NC | NC | NC | NC |
| Ozone resistance, dynamic (80 pphm, 40° C., 0 to 20% elongation) | | | | | | | | | | | | | |
| 24 hr | NC | NC | NC | NC | NC | NC | NC | NC | NC | NC | NC | NC | NC |
| 288 hr | NC | NC | NC | NC | NC | NC | NC | NC | NC | NC | NC | NC | NC |
| Low-temperature resistance: | | | | | | | | | | | | | |
| Gehman torsion test T100, °C. | −23 | −25 | −24 | −31 | −32 | −21 | −27 | −35 | −15 | −5 | −24 | −19 | −24 |

*[1] Poly(vinylidene fluoride), manufactured by Penwalt Co.
*[2] Vinylidene fluoride type fluororubber, manufactured by Du Pont
*[3] Tetrafluoroethylene-propylene type fluororubber, manufactured by Asahi Glass Co., Ltd.
*[4] Refer to Table 8.
*[5] No cracking

EXAMPLES 42 TO 46 AND COMPARATIVE EXAMPLES 29 TO 31

Each sample of multi-component copolymer rubber/vinyl chloride resin (hereinafter referred to as PVC) compositions (Examples 43 to 47 and Comparative Examples 29 to 30) and a butadiene-acrylonitrile rubber (hereinafter referred to as NBR)/PVC composition (Comparative Example 31) was compounded by a Banbury mixer in accordance with the formulation shown in Table 10. Each compound obtained was press-cured under the conditions shown in the lower section of Table 10.

The crosslinked rubber compositions obtained were subjected to measurement of characteristics in accordance with JIS K 6301.

These compositions were also subjected to measurement of sour gasoline resistance and sour gasohol resistance in the same methods as in Examples 35 to 42, except that methanol was substituted for the ethanol.

The measurement results are shown in the lower part of Table 11.

As is obvious from Table 11, the multi-component copolymer rubber compositions of this invention are excellent not only in sour gasoline resistance, sour gasohol resistance, ozone resistance and heat resistance but also in tensile strength, elongation and balance between gasoline resistance and low-temperature resistance.

EXAMPLES 48 TO 52 AND COMPARATIVE EXAMPLE 32

There were prepared compositions each consisting of the same copolymer (2-cyanoethyl acrylate/ethyl acrylate/n-butyl acrylate/ethylidenenorbornene=35/31/31/3 by weight) and the same PVC but having a different formulation. These compositions were compounded by a Banbury mixer with the formulations shown in the upper section of Table 12.

The crosslinked rubber compositions obtained were subjected to measurement of characteristics by the same methods as in Example 43. The results are shown in the lower part of Table 12.

As is obvious from Table 12, the multi-component copolymer rubber compositions of this invention are excellent in sour gasoline resistance and sour gasohol resistance, good in tensile strength and elongation and has a practically satisfactory level of a permanent compression set.

TABLE 10

|  | Compound symbol | | | | |
| --- | --- | --- | --- | --- | --- |
|  | P | Q | R | S | T |
| Polymer | 100.0 | 100.0 | 100.0 | 100.0 | 100.0 |
| Zinc oxide | 5.0 | | | | 5.0 |
| Stearic acid | 1.0 | 1.0 | 1.0 | 1.0 | 1.0 |
| SRF carbon black*[1] | 50.0 | 50.0 | 50.0 | 50.0 | 30.0 |
| DOP*[2] | 5.0 | 5.0 | 5.0 | 5.0 | 5.0 |
| Accelerator TT*[3] | 0.75 | | | | 1.5 |
| Accelerator CZ*[4] | | | | | 2.0 |
| Accelerator TRA*[5] | | | | 0.5 | |
| Accelerator EUR*[6] | | | | 1.0 | |
| Sulfur | 0.2 | | | | 0.5 |
| Peroximon F40*[7] | | 2.0 | | | |
| Ammonium benzoate | | | 1.0 | | |
| Potassium stearate | | | | 3.0 | |
| Conditions for press-curing | 170° C. × 20 min | 180° C. × 20 min | 175° C. × 20 min | 175° C. × 20 min | 160° C. × 20 min |

*[1] Semi-reinforcing furnace black
*[2] Dioctyl phthalate
*[3] Tetramethylthiuram disulfide
*[4] N—cyclohexyl-2-benzothiazolsulfenamide
*[5] Dipentamethylenethiuram hexasulfide
*[6] 1,3-Diethylthiourea
*[7] 1,3-Bis(t-butylperoxyisopropyl)benzene

TABLE 11

| | Example | | | | | Comparative Example | | |
|---|---|---|---|---|---|---|---|---|
| | 43 | 44 | 45 | 46 | 47 | 29 | 30 | 31 |
| Multi-component copolymer rubber, parts | 70 | 70 | 70 | 70 | 70 | 70 | 70 | 70*1 (NBR) |
| Component (A) composition (%) | | | | | | | | |
| 2-Cyanoethyl acrylate | 56 | 35 | 25 | 36 | | | 86 | |
| 4-Cyanobutyl acrylate | | | | | 42 | | | |
| Component (B) composition (%) | | | | | | | | |
| Ethyl acrylate | | 31 | 53 | 30 | 56 | 97 | | |
| n-Butyl acrylate | 41 | 31 | 12 | 31 | | | 11 | |
| Component (C) composition (%) | | | | | | | | |
| Ethylidenenorbornene | 3 | 3 | 3 | | | 3 | 3 | |
| Allyl glycidyl ether | | | | 3 | | | | |
| Vinyl chloroacetate | | | | | 2 | | | |
| Component (D) composition (%) | | | | | | | | |
| Methoxyethyl acrylate | | | 7 | | | | | |
| PVC*2, parts | 30 | 30 | 30 | 30 | 30 | 30 | 30 | 30 |
| Compound symbol*3 | P | Q | P | R | S | P | P | T |
| Properties of crosslinked rubber | | | | | | | | |
| Tensile strength, kg/cm² | 204 | 197 | 202 | 223 | 216 | 153 | 117 | 191 |
| Elongation, % | 420 | 370 | 450 | 410 | 400 | 620 | 170 | 510 |
| Hardness, JIS-A | 71 | 70 | 69 | 72 | 68 | 67 | 82 | 70 |
| Gasoline resistance (After immersion of 40° C. × 48 hr in Fuel C) | | | | | | | | |
| ΔV, % | +18 | +29 | +30 | +29 | +35 | +133 | +7 | +32 |
| Sour gasoline resistance (After immersion of 40° C. × 72 hr × n cycles in C containing 2.5% of lauroyl peroxide) | | | | | | | | |
| n = 3 (3 cycles) | NC*4 | NC | NC | NC | NC | Softened | NC | Cracks appeared |
| n = 10 (10 cycles) | NC | NC | NC | NC | NC | Softened | NC | Ruptured |
| Sour gasohol resistance (After immersion of 40° C. × 72 hr × n cycles in a solution consisting of 80 volume % of Fuel C containing 2.5% of lauroyl peroxide and 20 volume % of methanol) | | | | | | | | |
| n = 3 (3 cycles) | NC | NC | NC | NC | NC | Softened | NC | Cracks appeared |
| n = 6 (6 cycles) | NC | NC | NC | NC | NC | Softened | NC | Ruptured |
| n = 10 (10 cycles) | NC | NC | NC | NC | NC | Softened | NC | Ruptured |
| Heat resistance (120° C. × 288 hr aging with air heating) | | | | | | | | |
| Change of tensile strength, % | +4 | +6 | +5 | −3 | −2 | +12 | −7 | +5 |
| Change of elongation, % | −27 | −11 | −20 | −15 | −17 | −16 | −32 | −68 |
| Change of hardness, JIS-A | +6 | +8 | +8 | +6 | +7 | +4 | +8 | +27 |
| Ozone resistance, static (80 pphm, 40° C., 100% elongation) | | | | | | | | |
| 24 hr | | NC | NC | NC | NC | NC | NC | C-3 |
| resistance, dynamic (80 pphm, 40° C., 0 to 20% elongation) | | | | | | | | |
| 24 hr | | NC | NC | NC | NC | NC | NC | A-1 |
| 288 hr | | NC | NC | NC | NC | NC | NC | Ruptured |
| Low-temperature resistance: | | | | | | | | |
| Gehman torsion test T100, °C. | −23 | −19 | −21 | −25 | −26 | −14 | −3 | −22 |

*1 JSR N 220S, manufactured by Japan Synthetic Rubber Co., Ltd.
*2 Vinychlon 3000M, manufactured by Mitsui Toatsu Chemicals, Inc.
*3 Refer to Table 10.
*4 No cracking

TABLE 12

| | Example | | | | | Comparative Example |
|---|---|---|---|---|---|---|
| | 48 | 49 | 50 | 51 | 52 | 32 |
| Multi-component copolymer rubber, parts | 90 | 80 | 70 | 60 | 40 | 100 |
| PVC, parts | 10 | 20 | 30 | 40 | 60 | 0 |
| Zinc oxide | 5.0 | 5.0 | 5.0 | 5.0 | 5.0 | 5.0 |
| Stearic acid | 1.0 | 1.0 | 1.0 | 1.0 | 1.0 | 1.0 |
| SRF carbon black | 70.0 | 60.0 | 50.0 | 40.0 | 20.0 | 80.0 |
| DOP | 5.0 | 5.0 | 5.0 | 5.0 | 5.0 | 5.0 |
| Accelerator TT | 0.75 | 0.75 | 0.75 | 0.75 | 0.75 | 0.75 |
| Sulfur | 0.2 | 0.2 | 0.2 | 0.2 | 0.2 | 0.2 |
| Properties of crosslinked rubber | | | | | | |
| Tensile strength, kg/cm² | 189 | 201 | 217 | 220 | 195 | 126 |
| Elongation, % | 460 | 460 | 430 | 410 | 370 | 480 |
| Hardness, JIS-A | 68 | 70 | 71 | 72 | 74 | 69 |
| Sour gasoline resistance (After immersion of 40° C. × 72 hr × n cycles in Fuel C containing 2.5% of lauroyl peroxide) | | | | | | |
| n = 3 (3 cycles) | NC | NC | NC | NC | NC | NC |
| n = 10 (10 cycles) | NC | NC | NC | NC | NC | NC |
| Sour gasohol resistance (After immersion of 40° C. × 72 hr × n cycles in a solution containing of 80 volume % of Fuel C containing 2.5% of peroxide and 20 volume % of methanol) | | | | | | |
| n = 3 (3 cycles) | NC | NC | NC | NC | NC | NC |

TABLE 12-continued

|  | Example | | | | | Comparative Example |
|---|---|---|---|---|---|---|
|  | 48 | 49 | 50 | 51 | 52 | 32 |
| n = 6 (6 cycles) | NC | NC | NC | NC | NC | Softened |
| n = 10 (10 cycles) | NC | NC | NC | NC | NC | Softened |
| Permanent compression set (120° C. × 70 hr), % | 37 | 41 | 43 | 46 | 57 | 28 |

EXAMPLES 53 TO 56 AND COMPARATIVE EXAMPLES 33 TO 36

Multi-component copolymer rubber compositions (Examples 53 to 56) and multi-component copolymer rubbers (Comparative Examples 33 to 36) were compounded by a Banbury mixer with the formulations shown in Table 13. The compounds obtained were evaluated for processability from dischargability from Banbury mixer as well as from knitting performance, and good processability was indicated so o, and bad processability as X.

These compounds were press-cured under the conditions shown in Table 13. The vulcanized compounds were subjected to measurement of permanent compression set, heat resistance and gasoline resistance based on JIS K 6301 using the conditions shown in Table 14.

The results are shown in Table 14.

Comparison between the results of Examples 53 and 54 with the results of Comparative Examples 33 and 34 indicates that mixing of a conventional acrylic rubber [a multi-component copolymer rubber (I)] with a multi-component copolymer rubber of this invention overcomes the drawbacks of the conventional acrylic rubber, namely, processability, permanent compression set and gasoline resistance.

Comparison between the results of Examples 55 and 56 with the results of Comparative Examples 35 and 36 indicates that the drawback of a multi-component copolymer rubber of this invention, namely, heat resistance is improved by incorporating thereinto a conventional acrylic rubber [a multi-component copolymer rubber (I)].

TABLE 13

|  | A | B |
|---|---|---|
| Polymer | 100 | 100 |
| Zinc oxide | 5 |  |
| Stearic acid | 1 | 1 |

TABLE 13-continued

|  | A | B |
|---|---|---|
| HAF carbon black | 50 | 50 |
| Accelerator TT* | 0.75 |  |
| Sulfur | 0.2 |  |
| Ammonium benzoate |  | 1 |
| Conditions for press-curing | 170° C. × 20 min | 175° C. × 20 min |

*Tetramethylthiuram disulfide

TABLE 14

|  | Example | | | | Comparative Example | | | |
|---|---|---|---|---|---|---|---|---|
|  | 53 | 54 | 55 | 56 | 33 | 34 | 35 | 36 |
| Multi-component copolymer rubber of this invention | (b) 10 | (d) 20 | (b) 80 | (d) 70 |  |  | (b) 100 | (d) 100 |
| Multi-component copolymer rubber (I) | (a) 90 | (c) 80 | (a) 20 | (c) 30 | (a) 100 | (c) 100 |  |  |
| Compound formulation | A | B | A | B | A | B | A | B |
| Processability | o | o | o | o | x | x | o | o |
| Permanent compression set, % (150° C. × 70 hr) | 62 | 61 | 59 | 57 | 82 | 75 | 56 | 49 |
| Heat resistance (150° C. × 70 hr) | −32 | −29 | −41 | −38 | −29 | −25 | −52 | −49 |
| Change of elongation, % | −32 | −29 | −41 | −38 | −29 | −25 | −52 | −49 |
| Gasoline resistance (After immersion of 40° C. × 48 hr in Fuel C) | | | | | | | | |
| ΔV, % | 85 | 79 | 45 | 56 | 115 | 123 | 31 | 30 |

(a) Ethyl acrylate/ethylidenenorbornene = 97/3 by weight
(b) 2-Cyanoethyl acrylate/n-butyl acrylate/ethylidenenorbornene = 49/48/3 by weight
(c) Ethyl acrylate/butyl acrylate/methoxyethyl acrylate/allyl glycidyl ether = 40/30/27/3 by weight
(d) 2-Cyanoethyl acrylate/n-butyl acrylate/allyl glycidyl ether = 49/48/3 by weight

EXAMPLES 56 TO 61 AND COMPARATIVE EXAMPLES 37 TO 40

Each mixture having the formulation shown in Table 15 was kneaded by a Banbury mixer and an open roll and then press-cured at 170° C. for 20 min.

Each crosslinked rubber composition was subjected to measurement of characteristics in accordance with JIS K 6301.

The rubber composition was also subjected to measurement of sour gasoline resistance by the following method:

[Test method for sour gasoline resistance]

A sample was immersed at 70° C. for 24 hr in a solution obtained by dissolving 1 g of lauroyl peroxide in 99 g of Fuel C (a mixed solvent consisting of equal volumes of isooctane and toluene). This 1 cycle procedure was repeated 20 times (20 cycles). Then, the sample was dried at 100° C. for 15 hr under reduced pressure and subjected to measurement of tensile strength and elongation at break in accordance with JIS K 6301. The changes (%) from the value obtained before immersion were calculated and used as criteria of sour gasoline resistance.

The measurement results are shown in Table 16.

As is clear from Table 16, the composition of this invention gives a crosslinked product which is excellent in heat resistance, sour gasoline resistance, and ozone resistance, good in low-temperature resistance, tensile strength and elongation, and has a small permanent compression set.

TABLE 15

|  | Example | | | | | Comparative Example | | | |
|---|---|---|---|---|---|---|---|---|---|
|  | 57 | 58 | 59 | 60 | 61 | 37 | 38 | 39 | 40 |
| Copolymer (A$_1$)*$^1$ | 75 | 50 | 75 |  | 75 | 15 | 90 |  |  |
| Copolymer (A$_2$)*$^2$ |  |  |  | 75 |  |  |  |  |  |
| Copolymer (A$_3$)*$^3$ |  |  |  |  |  |  |  | 75 |  |
| Copolymer (A$_4$)*$^4$ |  |  |  |  |  |  |  |  | 75 |
| Copolymer (B$_1$)*$^5$ | 25 | 50 |  | 25 |  | 85 |  | 25 | 25 |
| Copolymer (B$_2$)*$^6$ |  |  | 25 |  |  |  |  |  |  |
| Copolymer (B$_3$)*$^7$ |  |  |  |  |  |  | 10 |  |  |
| Copolymer (B$_4$)*$^8$ |  |  |  |  | 25 |  |  |  |  |
| Zinc oxide | ← | ← | ← | ← | 5 | → | → | → | → |
| Stearic acid | ← | ← | ← | ← | 1 | → | → | → | → |
| HAF carbon black | ← | ← | ← | ← | 50 | → | → | → | → |
| Accelerator TT*$^9$ | ← | ← | ← | ← | 0.75 | → | → | → | → |
| Sulfur | ← | ← | ← | ← | 0.2 | → | → | → | → |

*$^1$A terpolymer produced by emulsion polymerization, consisting of 56% by weight of cyanoethyl acrylate, 41% by weight of butyl acrylate and 3% by weight of ethylidenenorbornene. Mooney viscosity ML$_{1+4}$ (100° C.) = 56

*$^2$A multi-component copolymer produced by emulsion polymerization, consisting of 26% by weight of cyanoethyl acrylate, 12% by weight of butyl acrylate, 53% by weight of ethyl acrylate, 3% by weight of ethylidenenorbornene and 6% by weight of methoxyethyl acrylate. Mooney viscosity ML$_{1+4}$ (100° C.) = 42

*$^3$A terpolymer produced by emulsion polymerization, consisting of 73% by weight of cyanoethyl acrylate, 24% by weight of butyl acrylate and 3% by weight of ethylidenenorbornene. Mooney viscosity ML$_{1+4}$ (100° C.) = 60

*$^4$A terpolymer produced by emulsion polymerization, consisting of 14% by weight of cyanoethyl acrylate, 83% by weight of butyl acrylate and 3% by weight of ethylidenenorbornene. Mooney viscosity ML$_{1+4}$ (100° C.) = 49

*$^5$A terpolymer produced by emulsion polymerization, consisting of 25% by weight of acrylonitrile, 40% by weight of butadiene and 35% by weight of butyl acrylate. Mooney viscosity ML$_{1+4}$ (100° C.) = 70

*$^6$A copolymer produced by emulsion polymerization, consisting of 35% by weight of acrlonitrile and 65% by weight of butadiene. Mooney viscosity ML$_{1+4}$ (100° C.) = 56

*$^7$A copolymer produced by emulsion polymerization, consisting of 35% by weight of acrylonitrile and 65% by weight of butadiene. A liquid rubber whose [η] as measured at 30° C. in tetrahydrofuran is 0.05.

*$^8$A terpolymer produced by emulsion polymerization, consisting of 30% by weight of acrylonitrile, 65% by weight of butadiene and 5% by weight of methacrylic acid. Mooney viscosity ML$_{1+4}$ (100° C.) = 60

*$^9$Tetramethylthiuram disulfide of 8 mm, a width of 50 mm and a length of 80 mm and having a smooth surface.

Adhesion by vulcanization

A sheet-like kneaded compound of the multi-component copolymer rubber of this invention and another sheet-like kneaded compound of a different rubber both obtained above were superimposed and inserted into a compression type mold, where they were subjected to vulcanization at 170° C. for 15 min at a surface pressure of 2 kg/cm$^2$ applied by an electrically heated press whereby a sheet-like laminate was produced.

Measurement of bonding strength

The laminate obtained above was cut into a ribbon-like sample of 2.5 mm in width and the sample was subjected to 90° peeling test in accordance with the peeling test specified by item 7 of JIS K 6801, whereby the bonding strength of the laminate was measured. The results are shown in Table 17.

Measurement of sour gasoline resistance

A test specimen was immersed at 40° C. for 72 hr in a solution obtained by dissolving 2.5 g of lauroyl peroxide in 97.5 g of Fuel C (a mixed solvent consisting of equal volumes of isooctane and toluene), in such a way that the multi-component copolymer rubber of the laminate came in contact with the solution. This 1 cycle procedure was repeated twice (2 cycles). Then, the specimen was taken out of the solution, dried at 100° C. for 15 hr under reduced pressure and bent at an angle of 180° to observe the formation of cracks. The results are shown in Table 17.

The unvulcanized rubber compounds used in the above preparation of kneaded compounds had the following formulations, in which unless otherwise specified, parts are by weight:

[Formulations of multi-component copolymer rubber compounds]

| Polymer (a) or (b) | 100 parts |
|---|---|

TABLE 16

|  | Example | | | | | Comparative Example | | | |
|---|---|---|---|---|---|---|---|---|---|
|  | 57 | 58 | 59 | 60 | 61 | 37 | 38 | 39 | 40 |
| Tensile strength, kg/cm$^2$ | 145 | 151 | 162 | 131 | 162 | 175 | 105 | 112 | 124 |
| Elongation, % | 360 | 370 | 420 | 430 | 370 | 380 | 480 | 220 | 450 |
| Hardness, JIS-A | 72 | 70 | 72 | 69 | 71 | 69 | 68 | 78 | 68 |
| Gasoline resistance (After immersion of 40° C. × 48 hr in Fuel C) ΔV, % | +35 | +45 | +31 | +42 | +33 | +54 | +21 | +11 | +58 |
| Sour gasoline resistance (After immersion of 70° C. × 24 hr × 20 cycles in Fuel C containing 1% of lauroyl peroxide) | | | | | | | | | |
| Change of tensile strength, % | −24 | −41 | −40 | −44 | −40 | −72 | −52 | −18 | −84 |
| Change of elongation, % | −28 | −45 | −41 | −38 | −38 | −83 | −22 | −25 | −10 |
| Heat resistance (150° C. × 12 hr aging with air heating) | | | | | | | | | |
| Change of tensile strength, % | +3 | −2 | +7 | +2 | +5 | −65 | −54 | −21 | +6 |
| Change of elongation, % | −31 | −41 | −45 | −49 | −42 | −92 | −88 | −64 | −32 |
| Change of hardness, JIS-A | +12 | +17 | +15 | +15 | +13 | +21 | +7 | +18 | +11 |
| Ozone resistance (50 pphm, 40° C., 30% elongation) | ← | ← | ←No cracking for 96 hr→ | | | | | → | → |
| Low-temperature resistance, Gehman torsion test | | | | | | | | | |
| T100, °C. | −22 | −25 | −24 | −23 | −23 | −26 | −28 | −7 | −19 |
| Permanent compression set, 150° C. × 70 hr | 25 | 32 | 31 | 59 | 38 | 61 | 29 | 53 | 33 |

EXAMPLES 62 TO 65 AND COMPARATIVE EXAMPLE 41

Test methods used in these Examples were as follows:

Preparation of kneaded compounds

Unvulcanized rubber compounds were kneaded by a rubber test roll mill (6-inch and 14-inch rolls) to obtain sheet-like kneaded compounds each having a thickness

| Steatric acid | 1 |
|---|---|
| HAF black | 50 |
| Peroximon F40 | 0.2 |

-continued

[Formulations of multi-component copolymer rubber compounds]

| | |
|---|---|
| Ca(OH)$_2$ | 10 |

Note:
(a) 2-Cyanoethylacrylate/ethyl acrylate/n-butyl acrylate/ethylidenenorbornene = 37/30/30/3 by weight
(b) 2-Cyanoethyl acrylate/ethyl acrylate/2-ethylhexyl acrylate/dicyclopentadiene = 25/40/32/3 by weight

[Formulations of other rubber compounds]

| | | | |
|---|---|---|---|
| NBR: | Polymer*[1] | 100 | parts |
| | Stearic acid | 1 | |
| | ZnO | 5 | |
| | SRF | 50 | |
| | Ca(OH)$_2$ | 10 | |
| | Epoxy resin*[2] | 5 | |
| | Maleic anhydride | 0.3 | |
| | 2-Methylimidazole | 1.0 | |
| | Sulfur | 0.3 | |
| | CZ | 2 | |
| | TET | 1.5 | |
| | TS | 1 | |
| FKM: | Polymer*[3] | 100 | parts |
| | CMP #2*[4] | 1.85 | |
| | CMB #3*[4] | 2.6 | |
| | MgO | 3 | |
| | Ca(OH)$_2$ | 6 | |
| | MT black | 20 | |
| CZ: | N—cyclohexylbenzothiazyl sulfenamide | | |
| TET: | Tetraethylthiuram disulfide | | |
| TS: | Tetramethylthiuram 25 | | |
| CR: | Neoprene WRT*[5] | 100 | parts |
| | Stearic acid | 0.5 | |
| | SRF black | 60 | |
| | Hydrous silicic acid | 20 | |
| | Aromatic oil | 15 | |
| | ZnO | 5 | |
| | Accelerator 22 | 0.5 | |

Note:
*[1]N 220S, manufactured by Japan Synthetic Rubber Co., Ltd.
*[2]Epicoat #828, manufactured by shell
*[3]E45, manufactured by Du pont
*[4]Vulcanization accelerator, manufactured by Du Pont, #20 is a polycyclic quaternary phosphate and #30 is an aromatic salt.
*[5]A polychloroprene rubber, manufactured by Du Pont.

As seen from Examples 62 to 65, laminates between the multi-component copolymer rubber of this invention and a commercially available rubber have a strong bonding strength between the two rubbers as a result of vulcanization. (The two rubbers may be allowed to adhere to each other by the use of an adhesive.)

Comparison of Example 62 with Comparative Example 41 indicates that a laminate of a multi-component copolymer rubber of this invention and an NBR has a strikingly improved sour gasoline resistance over the NBR.

TABLE 17

| | Example | | | | |
|---|---|---|---|---|---|
| | 62 Multi-component copolymer rubber (a)/NBR | 63 Multi-component copolymer rubber (a)/FKM | 64 Multi-component copolymer rubber (a)/CR | 65 Multi-component copolymer rubber (b)/NBR | Comparative Example 41 NBR |
| Bonding strength (peeling strength of laminate), kg/cm$^2$ | 2.1 | 2.0 | 2.5 | 2.3 | — |
| Sour gasoline resistance*[1] | NC*[2] | NC*[2] | NC*[2] | NC*[2] | Cracks appeared. |

*[1]After immersion of 40° C. × 72 hr × 2 cycles in Fuel C containing 2.5% of lauroyl peroxide.
*[2]No cracking

EXAMPLES 66 TO 72 AND COMPARATIVE EXAMPLE 42

Each sample of multi-component copolymer rubbers (Examples 66 to 72) and a butadiene-acrylonitrile rubber (NBR) (Comparative Example 42) shown in the upper section of Table 19 was subjected to compounding by a Banbury mixer in accordance with the formulation shown in Table 18. Each compound obtained was press-cured under the conditions shown in the bottom section of Table 18.

The crosslinked rubber compounds obtained were subjected to measurement of characteristics in accordance with JIS K 6301. The results are shown in Table 19.

The crosslinked rubber compounds were also subjected to measurement of sour gasoline resistance by the following method. The results are shown in Table 19.

[Text method for sour gasoline resistance]

A test specimen was immersed at 40° C. for 72 hr in a solution obtained by dissolving 2.5 g of lauroyl peroxide in 97.5 g of Fuel C (a mixed solvent consisting of equal volumes of isooctane and toluene). This 1 cycle procedure was repeated n times (n cycles). After each cycle, the specimen was taken out, dried at 100° C. for 15 hr under reduced pressure and bent at an angle of 180° to observe the formation of cracks.

As appreciated from Table 19, the rubber compounds of this invention are excellent in sour gasoline resistance, heat resistance and ozone resistance and good in permanent compression set and balance between gasoline resistance and low-temperature resistance. Therefore, they provide a very superior material for inner tubes of fuel rubber hoses.

TABLE 18

| | Compound symbol | | | | |
|---|---|---|---|---|---|
| | A | B | C | D | E |
| Compound formulation | | | | | |
| Polymer | 100.0 | 100.0 | 100.0 | 100.0 | 100.0 |
| Zinc oxide | 5.0 | | | | 5.0 |
| Stearic acid | 1.0 | 1.0 | 1.0 | 1.0 | 1.0 |
| HAF carbon black*[0] | 50.0 | 50.0 | 50.0 | 50.0 | |

TABLE 18-continued

| | Compound symbol | | | | |
|---|---|---|---|---|---|
| | A | B | C | D | E |
| DOP*2 | | | | | 5.0 |
| Accelerator TT*3 | 0.75 | | | | 1.5 |
| Accelerator CZ*4 | | | | | 2.0 |
| Accelerator TRA*5 | | | | 0.5 | |
| Accelerator EUR*6 | | | | 1.0 | |
| Sulfur | 0.2 | | | | 0.5 |
| Peroximon F40*7 | | 2.0 | | | |
| Ammonium benzoate | | | 1.0 | | |
| Potassium stearate | | | | 3.0 | |
| SRF carbon black*1 | | | | | 60.0 |
| Conditions for press-curing | 170° C. × 20 min | 180° C. × 20 min | 175° C. × 20 min | 175° C. × 20 min | 160° C. × 20 min |

*0High abrasion furnace black
*1Semi-reinforcing furnace black
*2Dioctyl phthalate
*3Tetramethylthiuram disulfide
*4N—cyclohexyl-2-benzothiazolesulfenamide
*5Dipentamethylenethiuram hexasulfide
*61,3-Diethylthiourea
*71,3-Bis(t-butylperoxyisopropyl)benzene

TABLE 19

| | Example | | | | | | | Comparative Example |
|---|---|---|---|---|---|---|---|---|
| | 66 | 67 | 68 | 69 | 70 | 71 | 72 | 42 |
| Multi-component copolymer rubber composition, | | | | | | | | |
| Component (A) | | | | | | | | |
| 2-Cyanoethyl acrylate | 49 | 37 | 26 | 35 | | 83 | 12 | NBR*1 |
| 4-Cyanobuthyl acrylate | | | | | 44 | | | |
| Component (B) | | | | | | | | |
| Ethyl acrylate | | 30 | 52 | 31 | 54 | | | |
| n-Butyl acrylate | 48 | 30 | 14 | 31 | | 14 | 85 | |
| Component (C) | | | | | | | | |
| Ethylidene norbornene | 3 | 3 | 3 | | | 3 | 3 | |
| Allyl glycidyl ether | | | | 3 | | | | |
| Vinyl chloroacetate | | | | | 2 | | | |
| Component (D) | | | | | | | | |
| Methoxyethyl acrylate | | | 5 | | | | | |
| Compound symbol*2 | A | B | A | C | D | A | A | A |
| Properties of crosslinked rubber | | | | | | | | |
| Tensile strength, kg/cm² | 131 | 136 | 129 | 154 | 142 | 83 | 132 | 197 |
| Elongation, % | 480 | 410 | 500 | 380 | 530 | 160 | 520 | 490 |
| Hardness, JIS-A | 72 | 71 | 69 | 67 | 65 | 84 | 66 | 72 |
| Gasoline resistance (After immersion of 40° C. × 48 hr in Fuel C) | | | | | | | | |
| ΔV, % | +31 | +35 | +38 | +39 | +41 | +4 | +70 | +40 |
| Sour gasoline resistance (After immersion of 40° C. × 72 hr × n cycles in Fuel C containing 2.5% of lauroyl peroxide) | | | | | | | | |
| n = 2 (2 cycles) | NC*3 | NC | NC | NC | NC | NC | NC | Cracks appered |
| n = 4 (4 cycles) | NC | NC | NC | NC | NC | NC Softened | NC | Ruptured |
| n = 8 (8 cycles) | NC | NC | NC | NC | NC | NC Softened | NC | Ruptured |
| Heat resistance (150° C. ×72 hr aging with air heating) | | | | | | | | |
| Change of tensile strength, % | −8 | ±0 | −11 | +4 | −9 | −11 | +2 | −82 |
| Change of elongation, % | −51 | −26 | −38 | −32 | −37 | −57 | −29 | −100 (No elongation) |
| Change of hardness, JIS-A | +13 | +9 | +12 | +13 | +14 | +14 | +10 | +25 |
| Ozone resistance (50 pphm, 40° C., 30% elongation | ← | ←No cracking for 168 hr→ | | | | | → | Cracks appeared in 2 hr. |
| Low-temperature resistance: | | | | | | | | |
| Gehman torsion test T100, °C. | −24 | −21 | −21 | −25 | −28 | −2 | −13 | −21 |
| Permanent compression set, (150° C. × 70 hr), % | 51 | 23 | 56 | 47 | 54 | 63 | 61 | 66 |

*1JSR N220S, manufactured by Japan Synthetic Rubber Co., Ltd.
*2Refer to Table 18.
*3No cracking

What is claimed is:

1. A multi-component copolymer rubber, consisting essentially of:

(A) 20 to 69.5% by weight of a cyano-substituted alkyl(methy)acrylate of the formula

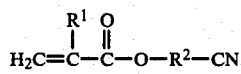

wherein $R^1$ is hydrogen or methyl and $R^2CN$ is a cyanoalkyl group of 2 to 12 carbon atoms,
(B) 30 to 79.5% by weight of an alkyl acrylate,
(C) 0.5 to 10% by weight of an epoxy group-containing, ethylenically unsaturated compound as a crosslinkable monomer, and
(D) 0 to 10% by weight of another ethylenically unsaturated monomer copolymerizable with components (A), (B) and (C).

2. The multi-component copolymer rubber according to claim 1, wherein the cyano-substituted alkyl acrylate (A) is 2-cyanoethyl acrylate, 3-cyanopropyl acrylate or 4-cyanobutyl acrylate.

3. The multi-component copolymer rubber according to claim 1, wherein the alkyl acrylate (B) is ethyl acrylate, propyl acrylate, n-butyl acrylate, n-pentyl acrylate, n-hexyl acrylate, 2-ethylhexyl acrylate or n-octyl acrylate.

4. The multi-component copolymer rubber according to claim 1, wherein the epoxy group-containing, ethylenically unsaturated compound (C-III) is allyl glycidyl ether, glycidyl methacrylate or glycidyl acrylate.

5. A fuel hose having a layer of a multi-component copolymer rubber according to claim 1 on the side in contact with the fuel.

* * * * *